US00RE48146E

(19) United States
(12) Reissued Patent
Hattori et al.

(10) Patent Number: US RE48,146 E
(45) Date of Reissued Patent: Aug. 4, 2020

(54) DATA SEARCH DEVICE, DATA SEARCH METHOD, COMPUTER READABLE MEDIUM STORING DATA SEARCH PROGRAM, DATA REGISTRATION DEVICE, DATA REGISTRATION METHOD, COMPUTER READABLE MEDIUM STORING DATA REGISTRATION PROGRAM, AND INFORMATION PROCESSING DEVICE

(71) Applicant: MITSUBISHI ELECTRIC CORPORATION, Chiyoda-ku (JP)

(72) Inventors: Mitsuhiro Hattori, Tokyo (JP); Nori Matsuda, Tokyo (JP); Takashi Ito, Tokyo (JP); Takumi Mori, Tokyo (JP); Takato Hirano, Tokyo (JP)

(73) Assignee: MITSUBISHI ELECTRIC CORPORATION, Chiyoda-ku (JP)

(21) Appl. No.: 15/984,468

(22) Filed: May 21, 2018

Related U.S. Patent Documents

Reissue of:
(64) Patent No.: 9,391,965
Issued: Jul. 12, 2016
Appl. No.: 14/350,987
PCT Filed: Jan. 25, 2012
PCT No.: PCT/JP2012/051533
§ 371 (c)(1),
(2) Date: Apr. 10, 2014
PCT Pub. No.: WO2013/111284
PCT Pub. Date: Aug. 1, 2013

(51) Int. Cl.
*H04L 29/06* (2006.01)
*H04L 9/30* (2006.01)
*H04L 9/08* (2006.01)

(52) U.S. Cl.
CPC ..... *H04L 9/0894* (2013.01); *H04L 9/30* (2013.01); *H04L 9/3073* (2013.01); *H04L 63/065* (2013.01); *H04L 2209/42* (2013.01)

(58) Field of Classification Search
CPC ..... H04L 9/0894; H04L 9/30; H04L 9/3073; H04L 2209/42; H04L 63/065
See application file for complete search history.

(56) References Cited

U.S. PATENT DOCUMENTS 6,519,700 B1 2/2003 Prasad Ram et al.
6,622,248 B1 9/2003 Hirai
(Continued)

FOREIGN PATENT DOCUMENTS

EP 1 225 500 7/2002
EP 1 225 500 A2 7/2002
(Continued)

OTHER PUBLICATIONS

First Chinese Office Action dated Nov. 2, 2016 issued in Application No. 201280068055.5 with English translation, 19 pages.
(Continued)

*Primary Examiner* — William H. Wood
(74) *Attorney, Agent, or Firm* — Oblon, McClelland, Maier & Neustadt, L.L.P.

(57) ABSTRACT

A data search server stores a system ciphertext including a data ciphertext and a keyword ciphertext in each category-specific DB unit for each data category, and stores each category-determination secret key being associated with each category-specific DB unit. A search request receiving unit receives from a data search terminal a search request including a search trapdoor and an index tag. A data searching unit searches for a category-determination secret key with which the index tag is decrypted to the same value as a key-determination value. Using the search trapdoor, the data searching unit performs a search of a Public-key Encryption with Keyword Search scheme on system ciphertexts in a category-specific DB unit associated with this category-determination secret key. A search result transmit-
(Continued)

ting unit transmits to the data search terminal a data ciphertext included in a system ciphertext which has been found as a hit in the search.

21 Claims, 27 Drawing Sheets

(56) References Cited

U.S. PATENT DOCUMENTS

| | | | | |
|---|---|---|---|---|
| 6,763,464 | B2 | 7/2004 | Wang et al. | |
| 7,068,787 | B1 | 6/2006 | Ta et al. | |
| 7,171,557 | B2 * | 1/2007 | Kallahalla et al. | 713/165 |
| 8,615,668 | B2 | 12/2013 | Matsuda et al. | |
| 2003/0081784 | A1 | 5/2003 | Kallahalla et al. | |
| 2005/0004924 | A1 | 1/2005 | Baldwin | |
| 2005/0138393 | A1 * | 6/2005 | Challener et al. | 713/186 |
| 2005/0271246 | A1 | 12/2005 | Sharma et al. | |
| 2009/0094200 | A1 | 4/2009 | Baeza-Yates et al. | |
| 2010/0142710 | A1 * | 6/2010 | Chrysler et al. | 380/277 |
| 2010/0246827 | A1 | 9/2010 | Lauter et al. | |
| 2012/0159180 | A1 | 6/2012 | Chase et al. | |
| 2012/0297201 | A1 | 11/2012 | Matsuda et al. | |
| 2012/0324240 | A1 | 12/2012 | Hattori et al. | |
| 2013/0067226 | A1 * | 3/2013 | Kunde et al. | 713/168 |
| 2013/0191650 | A1 | 7/2013 | Balakrishnan et al. | |
| 2013/0262863 | A1 | 10/2013 | Yoshino et al. | |
| 2013/0287206 | A1 | 10/2013 | Hattori et al. | |
| 2013/0287210 | A1 | 10/2013 | Matsuda et al. | |
| 2014/0019454 | A1 | 1/2014 | Carter et al. | |
| 2014/0247939 | A1 | 9/2014 | Hattori et al. | |
| 2014/0298009 | A1 | 10/2014 | Hattori et al. | |
| 2015/0207782 | A1 | 7/2015 | Hattori et al. | |

FOREIGN PATENT DOCUMENTS

| | | | |
|---|---|---|---|
| EP | 1 225 500 | A3 | 11/2002 |
| JP | 2000-11001 | | 1/2000 |
| JP | 2002-44072 | | 2/2002 |
| JP | 2003-178070 | | 6/2003 |
| JP | 2005-134990 | | 5/2005 |
| JP | 2005-284915 | | 10/2005 |
| JP | 2006-284915 | | 10/2005 |
| JP | 2006-210964 | | 8/2006 |
| JP | 2007-52698 | | 3/2007 |
| JP | 2010-160235 | | 7/2010 |
| JP | 2010-165275 | | 7/2010 |
| JP | 2011-147074 | | 7/2011 |
| JP | 2011-198079 | | 10/2011 |
| JP | 2012-83863 | | 4/2012 |
| JP | 2012-164031 | | 8/2012 |
| JP | WO 2012/095973 | | 6/2014 |
| WO | 2011 086668 | A1 | 7/2011 |
| WO | 2011 086687 | A1 | 7/2011 |
| WO | WO 2011/086668 | A1 | 7/2011 |
| WO | WO 2011/086687 | A1 | 7/2011 |

OTHER PUBLICATIONS

Second Chinese Office Action dated Feb. 24, 2017 issued in Application No. 201280068055.5 with English translation, 19 pages.
Extended European Search Report dated Dec. 18, 2015 in Application No. 12866425.7-1870/2808803 PCT/JP2012051533, 9 pages.
U.S. Office Action dated Jul. 17, 2015 issued in U.S. Appl. No. 14/350,987, 16 pages.
U.S. Office Action dated Nov. 27, 2015 issued in U.S. Appl. No. 14/350,987, 15 pages.
U.S. Office Action dated Mar. 26, 2015 issued in U.S. Appl. No. 14/350,987, 21 pages.
Supplementary European Search Report dated Sep. 26, 2016, 9 pages.
European Office Action dated Aug. 2, 2017, 7 pages.
U.S. Office Action dated Sep. 21, 2017 issued in U.S. Appl. No. 14/765,050, 23 pages.
Michel Abdalla, et al.; Searchable Encryption Revisited: Consistency Properties, Relation to Anonymous IBE, and Extensions, Jul. 2005, 41 pages.
M. Bellare, et al.; "Key-Privacy in Public-Key Encryption"; Sep. 2001, 30 pages.
Dan Boneh et al.; "Identity-Based Encryption from the Weil Pairing", Appears in SIAM J. of Computng, vol. 32, No. 3, pp. 586-615, 2003, 31 pages.
Dan Boneh et al.; "Public Key Encryption with keyword Search", 15 pages.
Xavier Boyen, Anonymous Hierarchical Identity-Based Encryption (Without Random Oracles), Jun. 8, 2006, 30 pages.
International Search Report, dated May 7, 2013 issued in PCT/JP2013/054735, 2 pages.
International Search Report, dated Apr. 17, 2012 issued in PCT/JP2012/051533, 2 pages.
Jonathan Katz et al., Predicate Encryption Supporting Disjunctions, Polynomial Equations, and Inner Products, 28 pages.
A. Menezes et al., "Chapter 8 Public-Key Encryption"—This is a Chapter from the Handbook of Applied Cryptography, CRC Press, 1996, For further information see www.cacr.math.waterloo.ca/hac, 38 pages.
Tatsuaki Okamoto et al., "Adaptively Attribute-Hiding (Hierarchical) Inner Product Encryption", Oct. 4, 2011, 33 pages.
Michael Schrefl et al., SemCrypt-Ensuring Privacy of Electronic Documents Through Semantic-Based Encrypted Query Processing, Proceedings of the 21st International Conference on Data Engineering (ICDE '05), 1084-4627/05, 2005, IEEE, Computer Society, 10 pages.
Zhiqiang Yang et al., "Privacy-Preserving Queries on Encrypted Data", D. Gollmann, I.Meier, and A. Sabelfeld (Eds.); ESORICS 2006, LNCS 1189, pp. 479-495, 2006, 18 pages.
Takanori Suga et al., Security of Searchable Encryption Revisited, Computer Security Symposium 2011, Oct. 19-21, 2011, 7 pages.
Summons to attend oral proceedings pursuant to Rule 115(1) EPC issued Jun. 4, 2018 in European Patent Application No. 13875718.2.
Indian Office Action dated Nov. 20, 2019 in Patent Application No. 6097/CHENP/2014 (with English translation), 7 pages.
Office Action dated Jun. 15, 2018, in co-pending U.S. Appl. No. 14/765,050.
Office Action dated Dec. 12, 2019 in Indian Patent Application No. 4862/CHENP/2015 (with English translation).
U.S. Appl. No. 14/765,050, filed Jul. 31, 2015, Takashi Ito, et al.
International Search Report issued Apr. 17, 2012, in PCT JP2012051533, filed Jan. 25, 2012.
Dan Bonch. et al., "Public Key Encryption with keyword Search", Eurocrypt Lecture Notes in Computer Science vol. 3027, 2004, 15 pages.
M. Bellare, et al., "Key-Privacy in Public-Key Encryption", Asiacrypt, Lecture Notes in Computer Science, vol. 2248, 2001, 30 pages.
A. Menezes, et al., "Public-Key Encryption", Handbook of Applied Cryptography, Chapter 8, 1997, pp. 283-319.
Dan Boneh, et al., "Identity-Based Encryption from the Weil Pairing", Crypto, Lecture Notes in Computer Science, vol. 2139, 2001, 31 pages.
Xavier Boyen, et al., "Anonymous Hierarchical Identity-Based Encryption (Without Random Oracles)", Crypto, Lecture Notes in Computer Science, vol. 4117, 2006, 30 pages.
Michel Abdalla, et al., "Searchable Encryption Revisited: Consistency Properties, Relation to Anonymous IBE, and Extensions", Crypto, Lecture Notes in Computer Science, vol. 3621, 2005, 43 pages.
Jonathan Katz, et al., "Predicate Encryption Supporting Disjunctions, Polynomial Equations, and Inner Products", Crypto, Lecture Notes in Computer Science, vol. 4965, 2008, 28 pages.
Tatsuaki Okamoto, et al., "Adaptively Attribute-Hiding (Hierarchical) Inner Product Encryption", Cryptology, Eprint Archive, Report 2011 543, 2011, 33 pages.

(56) References Cited

OTHER PUBLICATIONS

Extended European Search Report issued Dec. 18, 2015 in European Patent Application No. 12866425.7.

* cited by examiner

160: PUBLIC-KEY CORRESPONDENCE TABLE

| CATEGORY-DETERMINATION PUBLIC KEY | CATEGORY |
|---|---|
| $PK_1$ | PATENT |
| $PK_2$ | DESIGN |
| ... | ... |

Fig. 9

350: SECRET-KEY CORRESPONDENCE TABLE

| CATEGORY-DETERMINATION SECRET KEY | CATEGORY-SPECIFIC DB UNIT |
|---|---|
| $SK_1$ | $DB_1$ |
| $SK_2$ | $DB_2$ |
| ... | ... |

Fig. 18

192: KEY-DETERMINATION VALUE CORRESPONDENCE TABLE

| CATEGORY | | KEY-DETERMINATION VALUE |
|---|---|---|
| LARGE CLASSIFICATION | SMALL CLASSIFICATION | |
| PATENT | PRODUCT INVENTION | 11 |
| | METHOD INVENTION | 12 |
| | ... | ... |
| DESIGN | WHOLE DESIGN | 21 |
| | PARTIAL DESIGN | 22 |
| | ... | ... |
| ... | ... | ... |

Fig. 19

160: PUBLIC-KEY CORRESPONDENCE TABLE

| CATEGORY-DETERMINATION PUBLIC KEY | DATE |
|---|---|
| $PK_1$ | 1ST |
| $PK_2$ | 2ND |
| ... | ... |

Fig. 28

160: PUBLIC-KEY CORRESPONDENCE TABLE

| CATEGORY-DETERMINATION PUBLIC KEY | CATEGORY |
|---|---|
| $ID_1$ | PATENT |
| $ID_2$ | DESIGN |
| ... | ... |

DATA SEARCH DEVICE, DATA SEARCH METHOD, COMPUTER READABLE MEDIUM STORING DATA SEARCH PROGRAM, DATA REGISTRATION DEVICE, DATA REGISTRATION METHOD, COMPUTER READABLE MEDIUM STORING DATA REGISTRATION PROGRAM, AND INFORMATION PROCESSING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*The present application is an application for reissue of U.S. Pat. No. 9,391,965, issued Jul. 12, 2016, which is a national stage application of PCT/JP2012/051533.*

TECHNICAL FIELD

The present invention relates to a data search device, a data search method, a data search program, a data registration device, a data registration method, a data registration program, and an information processing device.

BACKGROUND ART

In the field of Public Key Cryptography (PKC), Public-key Encryption with Keyword Search (PEKS) is known as a technique for performing a keyword search without decrypting encrypted data (see Non-Patent Literature 1).

This PEKS realizes, for example, an application as described below.

Assume a situation where a sender transmits a data file including confidential information to a receiver via an external database (to be referred to as a "server" hereinafter). That is, assume a situation where the sender uploads data files to the server, and the receiver downloads a necessary data file from the server by a keyword search.

It should be noted here that the sender and the receiver wish to share both data files and keywords without revealing them to the server.

The receiver prepares in advance a pair of a public key and a secret key of public-key encryption (to be used for encrypting and decrypting data files) and a pair of a public key and a secret key of PEKS (to be used for encrypting keywords and generating search queries). Then, the receiver publishes both of the public keys.

Using the public key of public-key encryption of the receiver, the sender encrypts a data file to generate a ciphertext of the data file. In addition, using the public key of PEKS, the sender encrypts a keyword to generate a ciphertext of the keyword. The ciphertext of the keyword generated using the public key of PEKS will be hereinafter referred to as an "encrypted tag". The sender uploads the ciphertext of the data file together with the encrypted tag to the server.

Using the secret key of PEKS, the receiver encrypts a keyword to generate a ciphertext of the keyword. The ciphertext of the keyword generated using the secret key of PEKS will be hereinafter referred to as a "trapdoor". The receiver sends this trapdoor to the server as a search query.

Using the received trapdoor, the server performs a secure search on each of encrypted tags of ciphertexts of all data files in a database. Then, the server transmits to the receiver a ciphertext of a data file which has been found as a hit in the secure search.

It has been a problem with PEKS that a search need to be performed on the entirety of data, so that search processing time increases in proportion to the number of data files.

To solve this problem, some methods have been proposed.

Patent Literature 1 discloses a method in which an index storage unit configured to store a keyword and a document name by associating them with each other and an encrypted database configured to store an encrypted document are provided, and a search is performed for a keyword in the index storage unit. If no hit is found in the search, then a search is performed on all documents in the encrypted database. The index storage unit is updated in accordance with a search result.

However, it is a problem with this method that a search needs to be performed on all documents until the index storage unit is updated properly, so that a search process cannot be made faster. It is also a problem with this method that if a large number of various types of search requests occur, the effect of the index storage unit is weakened, so that the search process cannot be made faster. Further, it is a problem with this method that an existing system of a PEKS scheme needs to be changed greatly.

CITATION LIST

Patent Literature

Patent Literature 1: JP 2005-134990 A
Patent Literature 2: WO 2011/086668

Non-Patent Literature

Non-Patent Literature 1: Dan Boneh, Giovanni Di Crescenzo, Rafail Ostrovsky and Giuseppe Persiano, "Public Key Encryption with Keyword Search," Eurocrypt 2004, Lecture Notes in Computer Science, vol. 3027, pp. 506-522, 2004.

Non-Patent Literature 2: Mihir Bellare, Alexandra Boldyreva, Anand Desai and David Pointcheval, "Key-Privacy in Public-Key Encryption," Asiacrypt 2001, Lecture Notes in Computer Science, vol. 2248, pp. 566-582, 2001.

Non-Patent Literature 3: Alfred J. Menezes, Paul C. Van Oorschot, and Scott A. Vanstone, Handbook of Applied Cryptography, Chapter 8 "Public-Key Encryption," CRC Press, 2006.

Non-Patent Literature 4: Dan Boneh and Matthew Franklin, "Identity-Based Encryption from the Weil Pairing," Crypto 2001, Lecture Notes in Computer Science, vol. 2139, pp. 213-229, 2001.

Non-Patent Literature 5: Xavier Boyen and Brent Waters, "Anonymous Hierarchical Identity-Based Encryption (Without Random Oracles)," Crypto 2006, Lecture Notes in Computer Science, vol. 4117, pp. 290-307, 2006.

Non-Patent Literature 6: Michel Abdalla, Mihir Bellare, Dario Catalano, Eike Kiltz, Tadayoshi Kohno, Tanja Lange, John Malone-Lee, Gregory Neven, Pascal Paillier, and Haixia Shi, "Searchable Encryption Revisited: Consistency Properties, Relation to Anonymous IBE, and Extensions," Crypto 2005, Lecture Notes in Computer Science, vol. 3621, pp. 205-222, 2005.

Non-Patent Literature 7: Jonathan Katz, Amit Sahai, and Brent Waters, "Predicate Encryption Supporting Disjunctions, Polynomial Equations, and Inner Products," Eurocrypt 2008, Lecture Notes in Computer Science, vol. 4965, pp. 146-162, 2008.

Non-Patent Literature 8: Tatsuaki Okamoto and Katsuyuki Takashima, "Adaptively Attribute-Hiding (Hierarchical) Inner Product Encryption," Cryptology ePrint Archive, Report 2011/543, 2011.

SUMMARY OF INVENTION

Technical Problem

It is an object of the present invention, for example, to achieve a faster search process using Public-key Encryption with Keyword Search.

Solution to Problem

A data search device according to the present invention includes a data storage unit configured to store a plurality of data groups, each data group including one or more pieces of data, and a plurality of decryption keys for decrypting encrypted information, by associating each of the plurality of the data groups with each of the plurality of the decryption keys;

a key-determination information storage unit configured to store key-determination information for determining a decryption key;

a search condition input unit configured to obtain a search condition for searching for data, and obtain encrypted information generated by encrypting predetermined information;

a data group selecting unit configured to decrypt the encrypted information obtained by the search condition input unit by using each of the plurality of the decryption keys stored in the data storage unit, select a decryption key with which the encrypted information is decrypted to same information as the key-determination information, from among the plurality of the decryption keys, and select as a search target group a data group associated with the decryption key selected, from among the plurality of the data groups stored in the data storage unit;

a data searching unit configured to obtain as search result data a piece of data that satisfies the search condition obtained by the search condition input unit, from among the one or more pieces of data included in the search target group selected by the data group selecting unit; and a search result output unit configured to output the search result data obtained by the data searching unit.

Advantageous Effects of Invention

According to the present invention, a faster search process using Public-key Encryption with Keyword Search can be achieved.

BRIEF DESCRIPTION OF DRAWINGS

FIG. 9 is a diagram illustrating a secret-key correspondence table 350 in Embodiment 1;

FIG. 18 is a diagram illustrating a key-determination-value correspondence table 192 in Embodiment 1;

FIG. 19 is a diagram illustrating another example of the public-key correspondence table 160 in Embodiment 1;

FIG. 28 is a diagram illustrating a public-key correspondence table 160 in Embodiment 2.

DESCRIPTION OF EMBODIMENTS

Embodiment 1

A system that performs a search at high speed using Public-key Encryption with Keyword Search (PEKS) will be described.

PEKS is a technique for performing a keyword search without decrypting encrypted data (see Non-Patent Literature 1).

Figure 1:
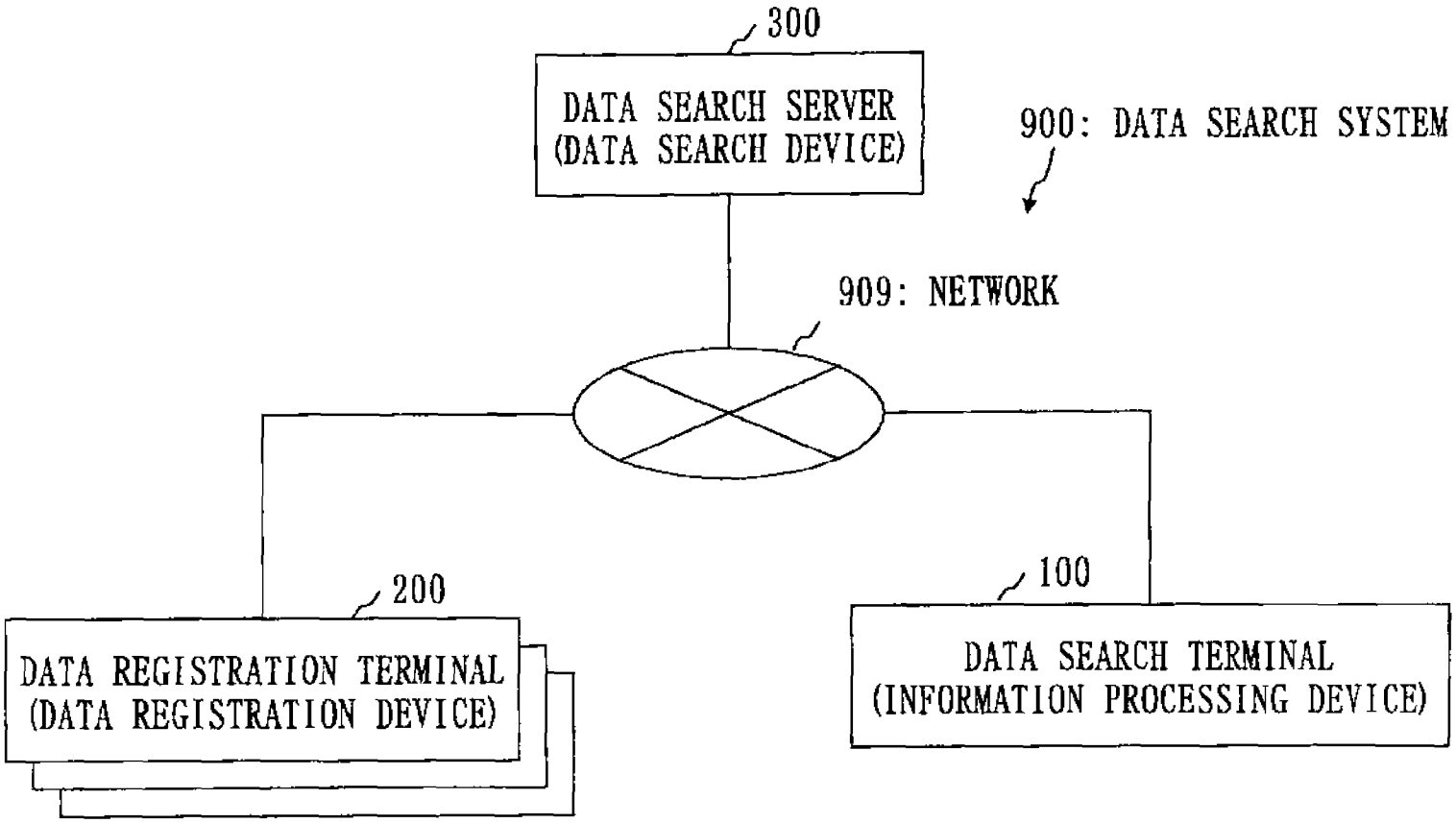
FIG. 1 is a configuration diagram of a data search system 900 in Embodiment 1.

FIG. 1 is a configuration diagram of a data search system 900 in Embodiment 1.

Referring to FIG. 1, a configuration of the data search system 900 in Embodiment 1 will be described.

The data search system 900 is an example of a system that performs a search using PEKS. By using PEKS, a keyword search can be performed with search target data and a search keyword being kept secret.

The data search system 900 includes one data search terminal 100, a plurality of data registration terminals 200, and one data search server 300. However, there may be a plurality of the data search terminals 100 and a plurality of the data search servers 300, and there may be one data registration terminal 200.

The data search terminal 100, the data registration terminals 200, and the data search server 300 are connected for communication via a network 909 (e.g., the Internet).

The data registration terminal 200 (an example of a data registration device) is a device (computer) configured to encrypt search target data and register the encrypted data in the data search server 300.

The data search terminal 100 (an example of an information processing terminal device) is a device configured to request a keyword search to the data search server 300 by specifying an encrypted search keyword.

The data search server 300 (an example of a data search device) is a device configured to perform a keyword search of PEKS on encrypted data registered by the data registration terminal 200, in accordance with an encrypted keyword specified by the data search terminal 100. The data search server 300 returns a search result to the data search terminal 100.

For example, the search target data may be electronic mail messages. In this case, the data search server 300 functions as a mail server, the data registration terminal 200 functions as a computer used by a sender of electronic mail messages, and the data search terminal 100 functions as a computer used by a receiver of electronic mail messages. Then, the data search system 900 is used as described below. Note that the following is an example of a method for using the data search system 900.

Each of senders A, B, and C of electronic mail messages transmits to the data search server 300 an electronic mail message encrypted using the data registration terminal 200. The data search server 300 stores the encrypted electronic mail messages from the senders A, B, and C.

If the receiver of electronic mail messages wishes to view the electronic mail message of the sender A, the receiver specifies to the data search terminal 100 an identifier (e.g., electronic mail address) of the sender A as a search keyword for the electronic mail message. The data search terminal 100 encrypts the search keyword (identifier of the sender A), and transmits the encrypted search keyword to the data search server 300.

The data search server 300 performs a keyword search of PEKS in accordance with the encrypted search keyword, and transmits the encrypted electronic mail message of the sender A to the data search terminal 100.

The data search terminal 100 receives the encrypted electronic mail message of the sender A, decrypts the received electronic mail message, and displays the decrypted electronic mail message.

With this arrangement, the senders A, B, and C and the receiver of electronic mail messages can keep electronic mail messages secret. Furthermore, the receiver of electronic mail messages can keep search keywords for electronic mail messages secret.

Figure 2:
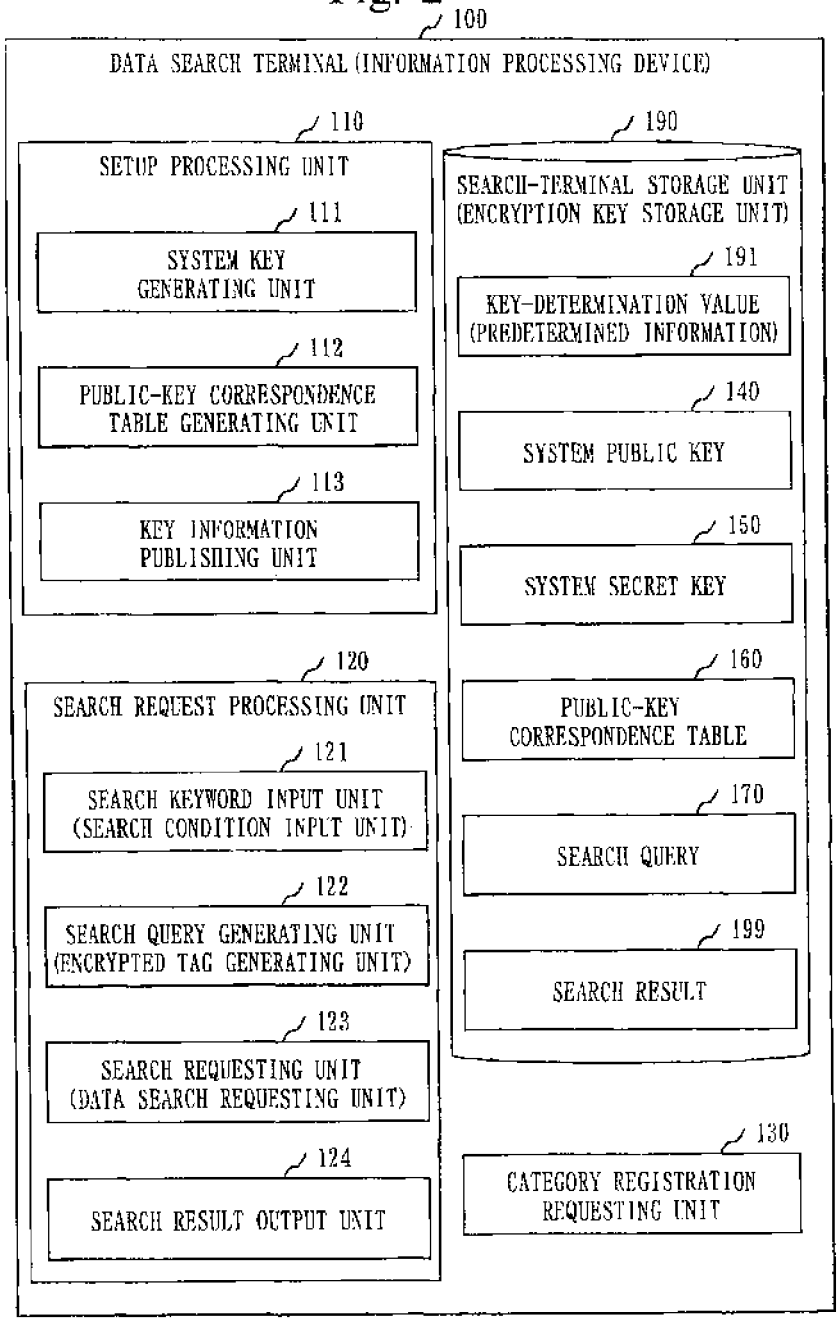
FIG. 2 is a functional configuration diagram of a data search terminal 100 in Embodiment 1.

FIG. 2 is a functional configuration diagram of the data search terminal 100 in Embodiment 1.

Referring to FIG. 2, a functional configuration of the data search terminal 100 in Embodiment 1 will be described.

The data search terminal 100 (an example of an information processing device) includes a setup processing unit 110, a search request processing unit 120, a category registration requesting unit 130, and a search-terminal storage unit 190.

The setup processing unit 110 includes a system key generating unit 111, a public-key correspondence table generating unit 112, and a key information publishing unit 113.

The system key generating unit 111 generates a key-determination value 191, a system public key 140, and a system secret key 150 to be described later.

The public-key correspondence table generating unit 112 generates a public-key correspondence table 160 to be described later.

The key information publishing unit 113 publishes the system public key 140, the system secret key 150, and the public-key correspondence table 160 to the data registration terminal 200 or the data search server 300.

The system key generating unit 111, the public-key correspondence table generating unit 112, and the key information publishing unit 113 will be described in detail with reference to a flowchart of a setup process to be described later.

Figure 3:
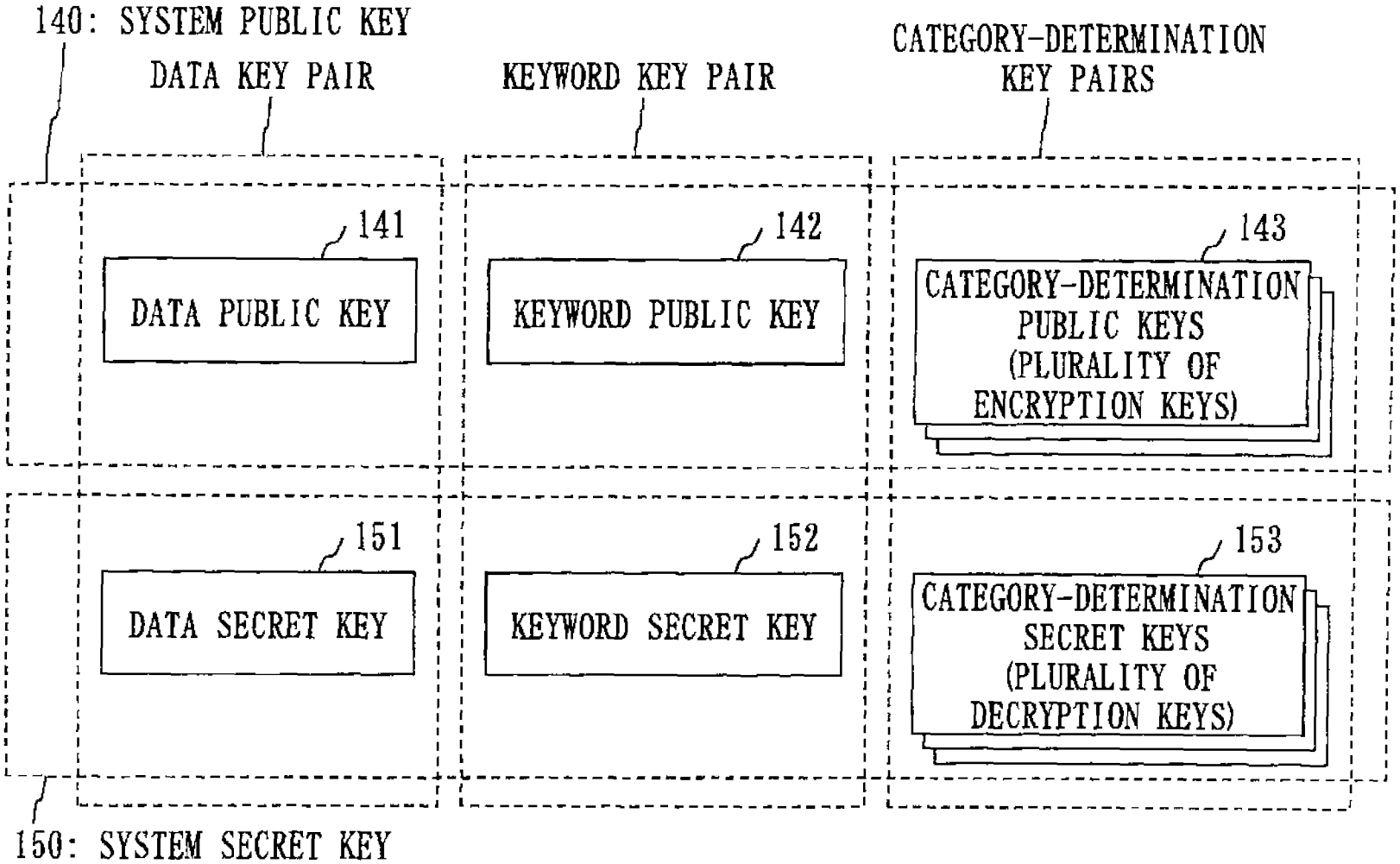
FIG. 3 is a diagram illustrating a system public key 140 and a system secret key 150 in Embodiment 1.

FIG. 3 is a diagram illustrating the system public key 140 and the system secret key 150 in Embodiment 1.

Referring to FIG. 3, the system public key 140 and the system secret key 150 in Embodiment 1 will be described.

The system public key 140 and the system secret key 150 constitute a key pair of public-key encryption (or PEKS) which are used in the data search system 900.

The system public key 140 includes one data public key 141, one keyword public key 142, and a plurality of category-determination public keys 143 (an example of a plurality of encryption keys).

The data public key 141 is key data (encryption key) for encrypting search target data.

The keyword public key 142 is key data (encryption key) for encrypting a keyword (data keyword) to be attached to search target data or a keyword (search keyword) specified when searching for data.

Each category-determination public key 143 is key data (encryption key) for encrypting information (key-determination value 191) for determining a category (data category) to which search target data belongs. The category-determination public key 143 is different for each data category.

The system secret key 150 includes one data secret key 151, one keyword secret key 152, and a plurality of category-determination secret keys 153 (an example of a plurality of decryption keys).

The data secret key 151 is key data (decryption key) for decrypting encrypted search target data.

The keyword secret key 152 is key data (master secret key) for generating a secret key (search trapdoor 171 to be described later) corresponding to a search keyword.

Each category-determination secret key 153 is key data (decryption key) for decrypting an encrypted key-determination value 191 (index tag 172 or index tag 233 to be described later). The category-determination secret key 153 is different for each data category.

The data public key 141 and the data secret key 151 constitute a key pair (key pair of public-key encryption) for data.

The keyword public key 142 and the keyword secret key 152 constitute a key pair (key pair of PEKS) for data keywords. The keyword public key 142 and the keyword secret key 152 may be used also as a key pair for data. In this case, the data public key 141 and the data secret key 151 are not needed.

The category-determination public keys 143 and the category-determination secret keys 153 constitute a plurality of key pairs (key pairs of public-key encryption) for determining data categories.

Figures 4, 5:
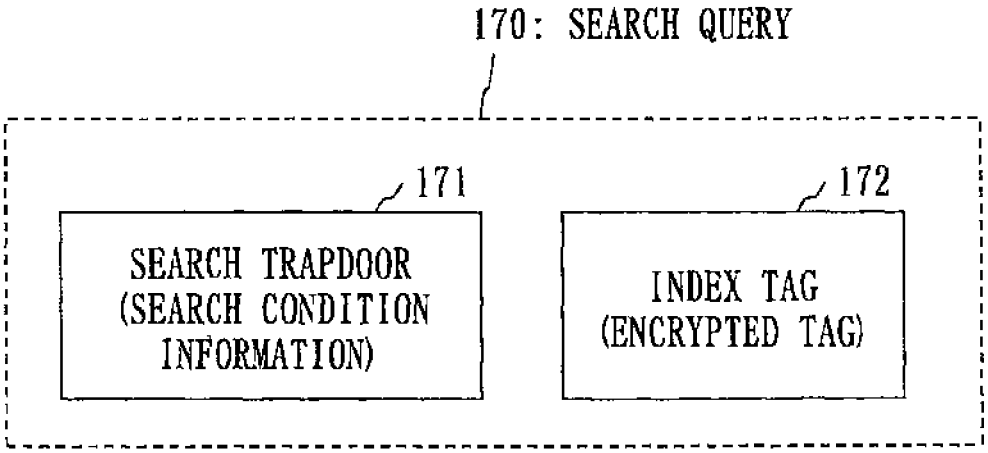
FIG. 4 is a diagram illustrating a public-key correspondence table 160 in Embodiment 1.
FIG. 5 is a diagram illustrating a search query 170 in Embodiment 1.

FIG. 4 is a diagram illustrating the public-key correspondence table 160 in Embodiment 1.

Referring to FIG. 4, the public-key correspondence table 160 in Embodiment 1 will be described.

The public-key correspondence table 160 is data associating each category-determination public key 143 with a data category.

In the public-key correspondence table 160 shown in FIG. 4, a category-determination public key 143 identified by "$PK_1$" is associated with a "patent" category, and a category-determination public key 143 identified by "$PK_2$" is associated with a "design" category.

Referring back to FIG. 2, the functional configuration of the data search terminal 100 will be further described.

The search request processing unit 120 includes a search keyword input unit 121, a search query generating unit 122, a search requesting unit 123, and a search result output unit 124.

The search keyword input unit 121 (an example of a search condition input unit) obtains from an input device or a storage device a search keyword (an example of a search condition) and a search target category that are specified by a user (data searcher).

The search query generating unit 122 (an example of an encrypted tag generating unit) generates a search query 170 based on the search keyword and the search target category. The search query 170 is data for specifying a search keyword.

The search requesting unit 123 (an example of a data search requesting unit) transmits the search query 170 to the data search server 300, and receives a search result 199 including encrypted data corresponding to the search keyword from the data search server 300.

The search result output unit 124 decrypts the encrypted data included in the search result 199 by using the data secret key 151, and outputs decrypted data.

The search keyword input unit 121, the search query generating unit 122, the search requesting unit 123, and the search result output unit 124 will be described in detail with reference to a flowchart of a data search request process to be described later.

FIG. 5 is a diagram illustrating the search query 170 in Embodiment 1.

Referring to FIG. 5, the search query 170 in Embodiment 1 will be described.

The search query 170 is data including a search trapdoor 171 (an example of search condition information) and an index tag 172 (an example of an encrypted tag).

The search trapdoor 171 is a secret key corresponding to a search keyword. The search trapdoor 171 is generated using the keyword secret key 152.

The index tag 172 is an encrypted key-determination value 191 encrypted using a category-determination public key 143 of a search target category.

Referring back to FIG. 2, the functional configuration of the data search terminal 100 will be further described.

The category registration requesting unit 130 requests the data search server 300 to generate a database for data belonging to a specific category.

The category registration requesting unit 130 will be described in detail with reference to a flowchart of a category registration request process to be described later.

The search-terminal storage unit 190 (an example of an encryption key storage unit) stores data used in the data search terminal 100.

For example, the search-terminal storage unit 190 stores the key-determination value 191, the system public key 140, the system secret key 150, the public-key correspondence table 160, the search query 170, and the search result 199.

Figure 6:
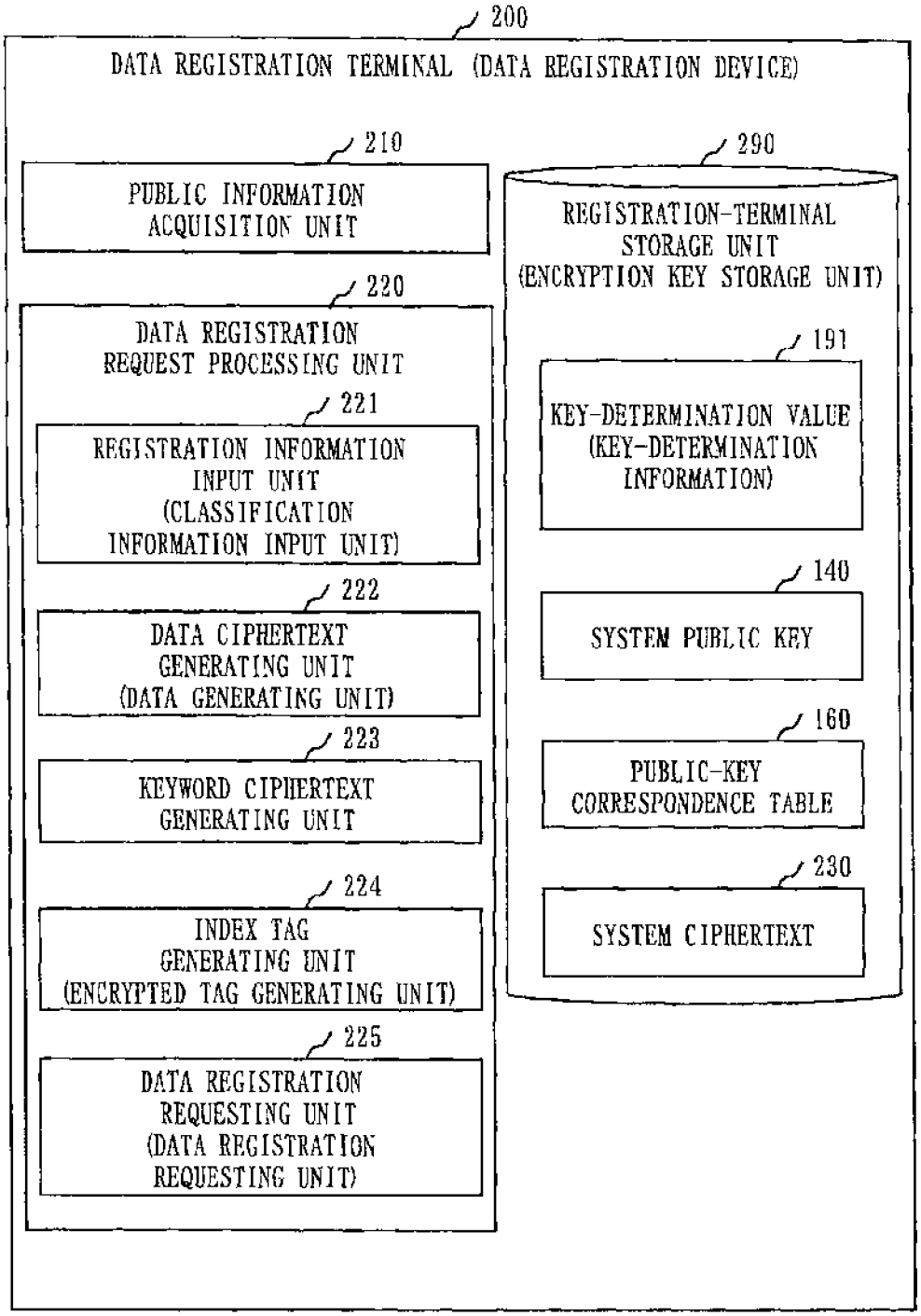
FIG. 6 is a functional configuration diagram of a data registration terminal 200 in Embodiment 1.

FIG. 6 is a functional configuration diagram of the data registration terminal 200 in Embodiment 1.

Referring to FIG. 6, a functional configuration of the data registration terminal 200 in Embodiment 1 will be described.

The data registration terminal 200 (an example of the data registration device) includes a public information acquisition unit 210, a data registration request processing unit 220, and a registration-terminal storage unit 290.

The public information acquisition unit 210 obtains the key-determination value 191, the system public key 140, and the public-key correspondence table 160 published by the data search terminal 100.

The public information acquisition unit 210 will be described in detail with reference to the flowchart of the setup process to be described later.

The data registration request processing unit 220 includes a registration information input unit 221, a data ciphertext generating unit 222, a keyword ciphertext generating unit 223, an index tag generating unit 224, and a data registration requesting unit 225.

The registration information input unit 221 (an example of a classification information input unit) obtains from an input device or a storage device data, a data keyword, and a data category that are specified by a user (data registering person).

The data ciphertext generating unit 222 (an example of a data generating unit) encrypts the data using the data public key 141.

The keyword ciphertext generating unit 223 encrypts the data keyword using the keyword public key 142.

The index tag generating unit 224 (an example of the encrypted tag generating unit) encrypts the key-determination value 191 using the category-determination public key 143 of the data category.

The data registration requesting unit 225 (an example of a data registration requesting unit) requests the data search server 300 to register a system ciphertext 230 including the data, the keyword and the key-determination value 191 that have been encrypted.

The registration information input unit 221, the data ciphertext generating unit 222, the keyword ciphertext generating unit 223, the index tag generating unit 224, and the data registration requesting unit 225 will be described in detail with reference to a flowchart of a data registration request process to be described later.

Figure 7:
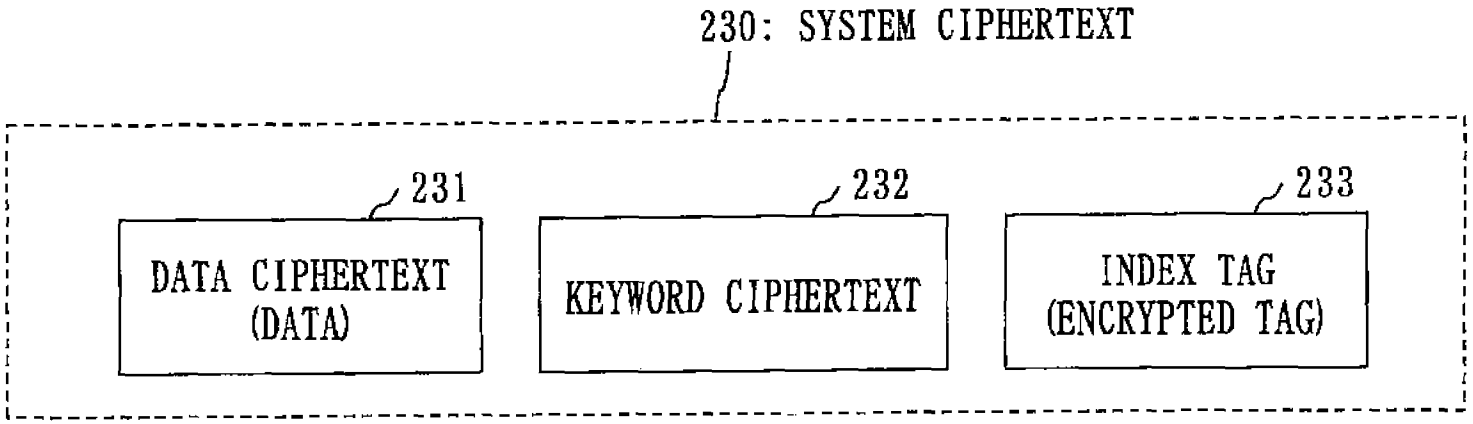
FIG. 7 is a diagram illustrating a system ciphertext 230 in Embodiment 1.

FIG. 7 is a diagram illustrating the system ciphertext 230 in Embodiment 1.

Referring to FIG. 7, the system ciphertext 230 in Embodiment 1 will be described.

The system ciphertext 230 is data including a data ciphertext 231, a keyword ciphertext 232, and an index tag 233.

The data ciphertext 231 (an example of data) is generated by encrypting data using the data public key 141.

The keyword ciphertext 232 is generated by encrypting a data keyword using the keyword public key 142.

The index tag 233 (an example of the encrypted tag) is generated by encrypting the key-determination value 191 using the category-determination public key 143 of a category to which the data belongs.

Referring back to FIG. 6, the functional configuration of the data registration terminal 200 will be further described.

The registration-terminal storage unit 290 stores data used in the data registration terminal 200.

For example, the registration-terminal storage unit 290 stores the key-determination value 191, the system public key 140, the public-key correspondence table 160, and the system ciphertext 230.

Figure 8:
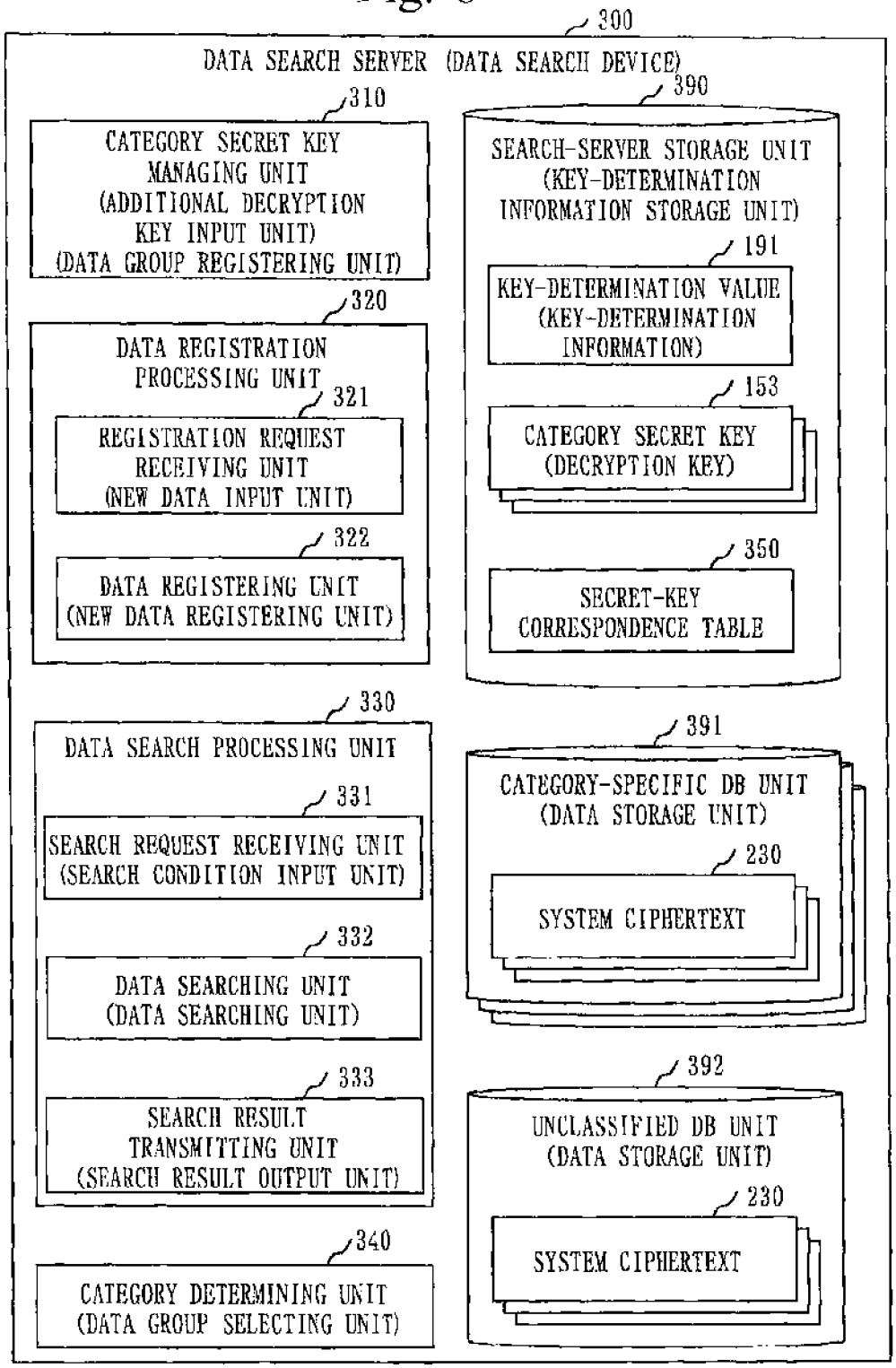
FIG. 8 is a functional configuration diagram of a data search server 300 in Embodiment 1.

FIG. 8 is a functional configuration diagram of the data search server 300 in Embodiment 1.

Referring to FIG. 8, a functional configuration of the data search server 300 in Embodiment 1 will be described.

The data search server 300 (an example of the data search device) includes a category secret key managing unit 310, a data registration processing unit 320, a data search processing unit 330, a category determining unit 340, and a search-server storage unit 390.

The data search server 300 further includes a database for each data category (to be referred to as a "category-specific DB unit 391" hereinafter).

The data search server 300 also includes a database for data not classified into any category (to be referred to as an "unclassified DB unit 392" hereinafter).

The category secret key managing unit 310 (an example of an additional decryption key input unit and a data group registering unit) manages the key-determination value 191 and the category-determination secret keys 153 that are generated by the data search terminal 100.

The category secret key managing unit 310 also generates a category-specific DB unit 391 to be associated with each category-determination secret key 153.

The category secret key managing unit 310 further generates a secret-key correspondence table 350 associating each category-determination secret key 153 with each category-specific DB unit 391.

The category secret key managing unit 310 will be described in detail with reference to the flowchart of the setup process and a flowchart of a category registration process to be described later.

The data registration processing unit 320 includes a registration request receiving unit 321 and a data registering unit 322.

The registration request receiving unit 321 (an example of a new data input unit) receives a registration request for data (the system ciphertext 230 shown in FIG. 7) transmitted from the data registration terminal 200.

The data registering unit 322 (an example of a new data registering unit) stores the data in the category-specific DB unit 391 of the category to which the data belongs, in accordance with the registration request for the data.

The registration request receiving unit 321 and the data registering unit 322 will be described in detail with reference to a flowchart of a data registration process to be described later.

The data search processing unit 330 includes a search request receiving unit 331, a data searching unit 332, and a search result transmitting unit 333.

The search request receiving unit 331 (an example of the search condition input unit) receives a search request for data (the search query shown in FIG. 5) transmitted from the data search terminal 100.

The data searching unit 332 (an example of a data searching unit) searches the category-specific DB unit 391 of a search target category, in accordance with the search request for the data.

The search result transmitting unit 333 (an example of a search result output unit) transmits a search result including data (the system ciphertext 230 shown in FIG. 7) that satisfies a search condition to the data search terminal 100.

The search request receiving unit 331, the data searching unit 332, and the search result transmitting unit 333 will be described in detail with reference to a flowchart of a data search process to be described later.

The category determining unit 340 (an example of a data group selecting unit) determines the category-specific DB unit 391 of the category to which the data belongs based on the registration request for the data, and determines the category-specific DB unit 391 of the search target category based on the search request for the data.

The category determining unit 340 will be described in detail with reference to the flowchart of the data registration process and the flowchart of the data search process to be described later.

The search-server storage unit 390 stores data used in the data search server 300.

For example, the search-server storage unit 390 stores the key-determination value 191, the category-determination secret keys 153, and the secret-key correspondence table 350.

FIG. 9 is a diagram illustrating the secret-key correspondence table 350 in Embodiment 1.

Referring to FIG. 9, the secret-key correspondence table 350 in Embodiment 1 will be described.

The secret-key correspondence table 350 is data associating each category-determination secret key 153 with a category-specific DB unit 391.

In the secret-key correspondence table 350 shown in FIG. 9, a category-determination secret key 153 identified by "$SK_1$." is associated with a category-specific DB unit 391 identified by "$DB_1$", and a category-determination secret key 153 identified by "$SK_2$" is associated with a category-specific DB unit 391 identified by "$DB_2$".

Referring back to FIG. 8, the functional configuration of the data search server 300 will be further described.

Each category-specific DB unit 391 (an example of a data storage unit) stores one or more system ciphertexts 230 that have been classified into the same category (an example of a data group).

The unclassified DB unit 392 (an example of the data storage unit) stores one or more system ciphertexts 230 that have not been classified into any category (an example of an unclassified group).

Figure 10:
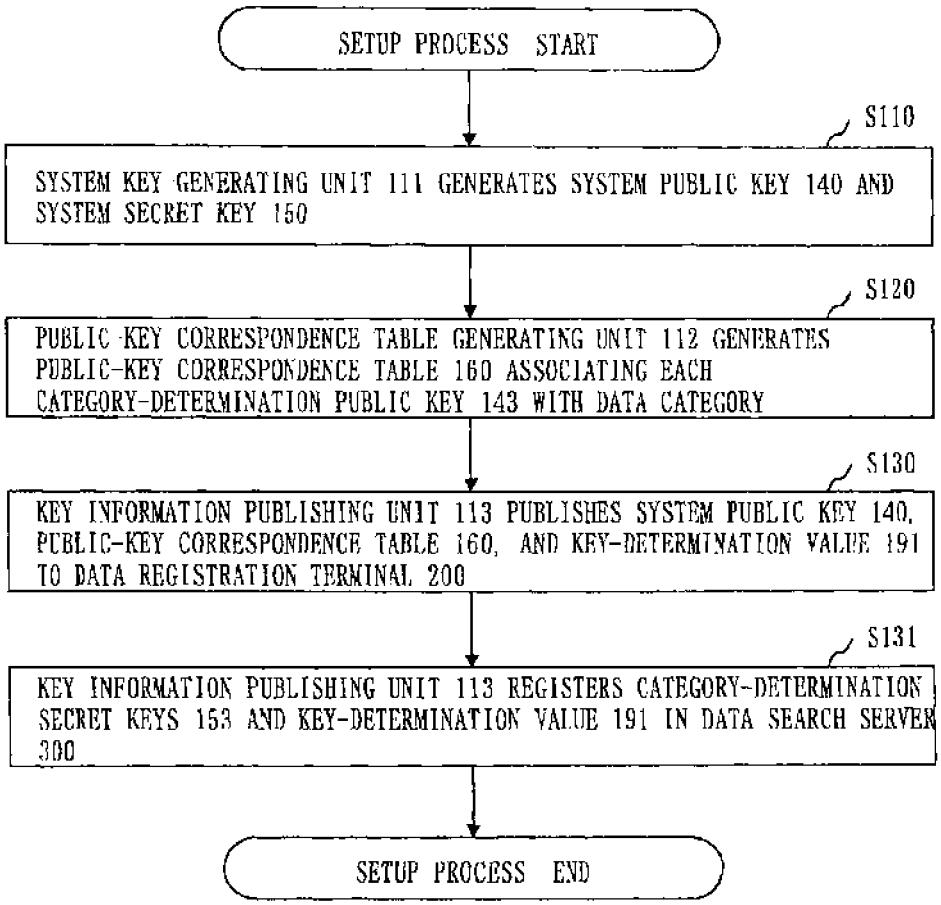
FIG. 10 is a flowchart illustrating a setup process of the data search terminal 100 in Embodiment 1.

FIG. 10 is the flowchart illustrating the setup process of the data search terminal 100 in Embodiment 1.

Referring to FIG. 10, the setup process of the data search terminal 100 in Embodiment 1 will be described.

A user who wishes to perform a data search (to be referred to as a "searcher" hereinafter) activates the setup processing unit 110 of the data search terminal 100, and the setup processing unit 110 of the data search terminal 100 executes the setup process (S110 to S131) described below.

In S110, the system key generating unit 111 generates a system public key 140 and a system secret key 150 (see FIG. 3). For a key generation method, refer to Non-Patent Literature 3.

At this time, the system key generating unit 111 generates a key pair of a data public key 141 and a data secret key 151 using a key generation algorithm of a public-key encryption scheme. RSA encryption (RSA is a registered trademark) is an example of the public-key encryption scheme.

The system key generating unit 111 also generates a key pair of a keyword public key 142 and a keyword secret key 152 using a key generation algorithm of a PEKS scheme.

The system key generating unit 111 also generates a plurality of key pairs of category-determination public keys 143 and category-determination secret keys 153 using a key generation algorithm of a public-key encryption scheme. For example, the system key generating unit 111 uses a public-key encryption scheme with key-privacy, such as ElGamal encryption or Cramer-Shoup encryption. Key-privacy refers to the property that the public key used cannot be known by looking at a ciphertext. The number of key pairs of the category-determination public keys 143 and the category-determination secret keys 153 is the number of categories for data classification, and is specified (input) by the searcher to the system key generating unit 111 of the data search terminal 100.

After S110, processing proceeds to S120.

In S120, using an input device (e.g., a keyboard or a mouse), the searcher inputs to the public-key correspondence table generating unit 112 of the data search terminal 100 category information indicating a data category to be associated with each category-determination public key 143 generated in S110. That is, the public-key correspondence table generating unit 112 obtains from the input device the category information specified by the searcher.

In accordance with the category information that has been input, the public-key correspondence table generating unit 112 generates a public-key correspondence table 160 as shown in FIG. 4. The public-key correspondence table 160 is data associating each category-determination public key 143 with a data category.

For example, when the data category to be associated with the category-determination public key 143 identified by "$PK_1$" is "patent", the public-key correspondence table generating unit 112 associates "$PK_1$" with "patent" and sets them in the public-key correspondence table 160.

After S120, processing proceeds to S130.

In S130, the key information publishing unit 113 publishes a key-determination value 191 which is predetermined, the system public key 140 generated in S110, and the public-key correspondence table 160 generated in S120, as public information to the data registration terminal 200. The key-determination value 191 is a predetermined value (e.g., "1").

For example, the key information publishing unit 113 of the data search terminal 100 registers the public information with a predetermined server (e.g., the data search server 300), and the public information acquisition unit 210 of the data registration terminal 200 obtains the public information from the predetermined server. The public information acquisition unit 210 stores the obtained public information in the registration-terminal storage unit 290.

Alternatively, for example, the public information acquisition unit 210 of the data registration terminal 200 transmits a publication request for requesting the public information to the data search terminal 100, and the key information publishing unit 113 of the data search terminal 100 receives the publication request. Then, the key information publishing unit 113 of the data search terminal 100 transmits the public information to the data registration terminal 200, and the public information acquisition unit 210 of the data registration terminal 200 receives the public information. The public information acquisition unit 210 stores the received public information in the registration-terminal storage unit 290.

After S130, processing proceeds to S131.

In S131, the key information publishing unit 113 transmits to the data search server 300 the key-determination value 191 which is predetermined and a plurality of the category-determination secret keys 153 generated in S110. The key-determination value 191 is the same as the value published to the data registration terminal 200.

Note that the key information publishing unit 113 may only transmit at least any one of the plurality of the category-determination secret keys 153 to the data search server 300. That is, there may be category-determination secret keys 153 which are not transmitted to the data search server 300. For example, the searcher specifies a category-determination secret key 153. Then, the key information publishing unit 113 transmits to the data search server 300 the category-determination secret key 153 specified by the searcher among the plurality of the category-determination secret keys 153.

At this time, the category secret key managing unit 310 of the data search server 300 receives the key-determination value 191 and the category-determination secret keys 153 transmitted by the key information publishing unit 113 of the data search terminal 100. The category secret key managing unit 310 stores the key-determination value 191 and the category-determination secret keys 153 that have been received in the search-server storage unit 390.

Then, the category secret key managing unit 310 generates a category-specific DB unit 391 for each of the received category-determination secret keys 153. The category-specific DB unit 391 is a database for storing a system ciphertext 230 (see FIG. 7) including an index tag 233 generated using the category-determination public key 143 which constitutes a key pair with the category-determination secret key 153.

The category secret key managing unit 310 also generates a secret-key correspondence table 350 as shown in FIG. 9. For example, when the category-specific DB unit 391 identified by "$DB_1$" is generated for the category-determination secret key 153 identified by "$SK_1$", the category secret key managing unit 310 associates "$SK_1$" with "$DB_1$" and sets them in the secret-key correspondence table 350.

S131 completes the setup process.

Figure 11:
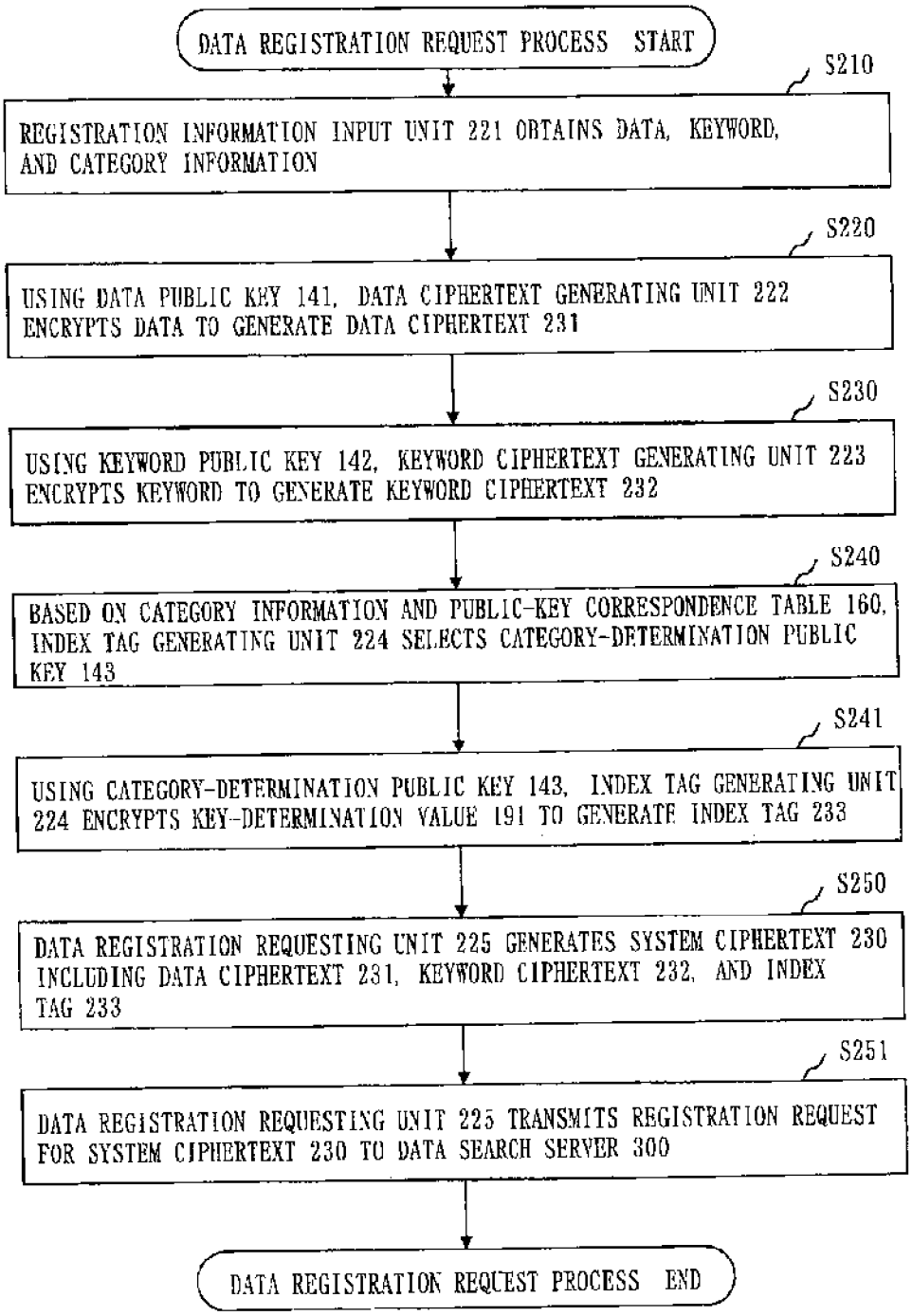
FIG. 11 is a flowchart illustrating a data registration process of the data registration terminal 200 in Embodiment 1.

FIG. 11 is the flowchart illustrating the data registration process of the data registration terminal 200 in Embodiment 1.

Referring to FIG. 11, the data registration process of the data registration terminal 200 in Embodiment 1 will be described.

A user who wishes to register search target data (to be referred to as a "registering person" hereinafter) activates the data registration request processing unit 220 of the data registration terminal 200, and the data registration request processing unit 220 of the data registration terminal 200 executes the data registration process (S210 to S251) described below.

In S210, using an input device, the registering person inputs to the registration information input unit 221 of the data registration terminal 200 data which the registering person wishes to register as search target data, a keyword associated with the data, and category information indicating a category to which the data belongs. That is, the registration information input unit 221 obtains from the input device the data, the keyword, and the category information that are specified by the registering person.

After S210, processing proceeds to S220.

In S220, the data ciphertext generating unit 222 obtains the data public key 141 from the registration-terminal storage unit 290, and encrypts the data input in S210 using the obtained data public key 141. The encrypted data will be hereinafter referred to as a "data ciphertext 231".

After S220, processing proceeds to S230.

In S230, the keyword ciphertext generating unit 223 obtains the keyword public key 142 from the registration-terminal storage unit 290, and encrypts the keyword input in S210 using the obtained keyword public key 142. The encrypted keyword will be hereinafter referred to as a "keyword ciphertext 232".

After S230, processing proceeds to S240.

In S240, the index tag generating unit 224 refers to the public-key correspondence table 160 stored in the registration-terminal storage unit 290.

Then, the index tag generating unit 224 selects a category-determination public key 143 associated with the category indicated by the category information input in S210 from among the plurality of the category-determination public keys 143 indicated in the public-key correspondence table 160, and obtains the selected category-determination public key 143 from the registration-terminal storage unit 290.

After S240, processing proceeds to S241.

In S241, the index tag generating unit 224 obtains the key-determination value 191 from the registration-terminal storage unit 290, and encrypts the key-determination value 191 using the category-determination public key 143 obtained in S240. The encrypted key-determination value 191 will be hereinafter referred to as an "index tag 233".

After S241, processing proceeds to S250.

In S250, the data registration requesting unit 225 generates a system ciphertext 230 (see FIG. 7) including the data ciphertext 231 generated in S220, the keyword ciphertext 232 generated in S230, and the index tag 233 generated in S241.

After S250, processing proceeds to S251.

In S251, the data registration requesting unit 225 transmits to the data search server 300 a registration request for requesting registration of the system ciphertext 230 generated in S250. The registration request is data including the system ciphertext 230.

S251 completes the data registration request process.

Figure 12:
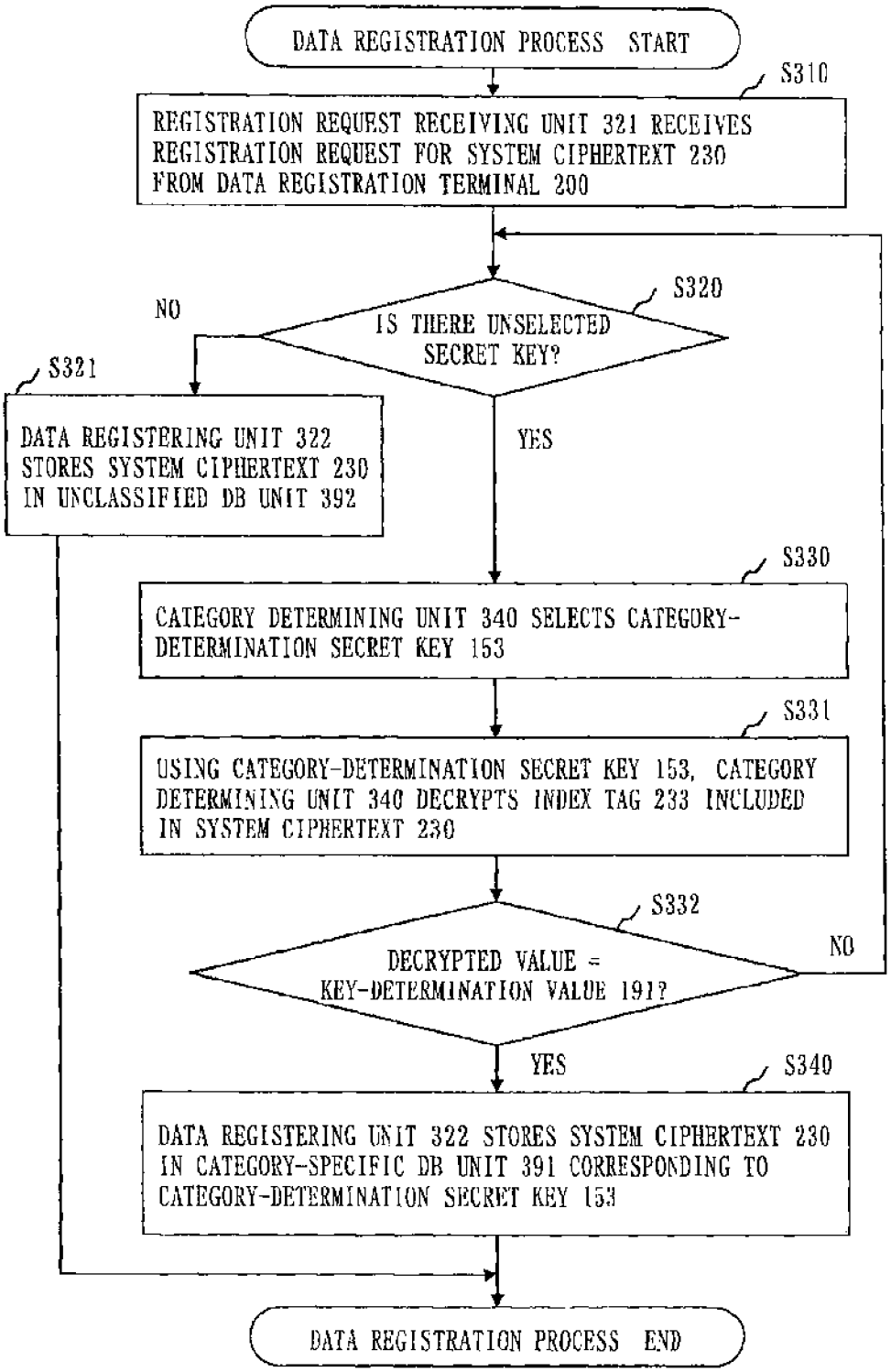
FIG. 12 is a flowchart illustrating a data registration process of the data search server 300 in Embodiment 1.

FIG. 12 is the flowchart illustrating the data registration process of the data search server 300 in Embodiment 1.

Referring to FIG. 12, the data registration process of the data search server 300 in Embodiment 1 will be described.

In S310, the registration request receiving unit 321 receives the registration request for the system ciphertext 230 transmitted from the data registration terminal 200.

After S310, processing proceeds to S320.

In S320, the category determining unit 340 determines whether or not there is any unselected category-determination secret key 153 which has not been selected in S330 to be described later in the search-server storage unit 390.

If there is any unselected category-determination secret key 153 (YES), processing proceeds to S330.

If there is no unselected category-determination secret key 153 (NO), processing proceeds to S321.

In S330, the category determining unit 340 selects one unselected category-determination secret key 153 from the search-server storage unit 390, and obtains the selected category-determination secret key 153 from the search-server storage unit 390.

After S330, processing proceeds to S331.

In S331, the category determining unit 340 obtains the index tag 233 from the system ciphertext 230 received in S310, and decrypts the obtained index tag 233 using the category-determination secret key 153 obtained in S330. A value obtained by decrypting the index tag 233 will be hereinafter referred to as a decrypted value of the index tag 233.

After S331, processing proceeds to S332.

In S332, the category determining unit 340 compares the decrypted value of the index tag 233 obtained in S331 with the key-determination value 191 stored in the search-server storage unit 390.

If the decrypted value of the index tag 233 is equal to the key-determination value 191 (YES), processing proceeds to S340.

If the decrypted value of the index tag 233 is different from the key-determination value 191 (NO), processing returns to S320.

In S340, the data registering unit 322 refers to the secret-key correspondence table 350 (see FIG. 9) stored in the search-server storage unit 390, and selects a category-specific DB unit 391 associated with the category-determination secret key 153 selected in S330, from among the plurality of the category-specific DB units 391 indicated in the secret-key correspondence table 350.

Then, the data registering unit 322 stores the system ciphertext 230 received in S310 in the selected category-specific DB unit 391.

S340 completes the data registration process.

In S321, the data registering unit 322 stores the system ciphertext 230 received in S310 in the unclassified DB unit 392. That is, if the data ciphertext 231 of the system ciphertext 230 is not classified into any of the categories of the category-specific DB units 391, the data registering unit 322 stores the system ciphertext 230 in the unclassified DB unit 392. The unclassified DB unit 392 is generated in the data search server 300 in advance.

S321 completes the data registration process.

Through the data registration request process shown in FIG. 11 and the data registration process shown in FIG. 12, the system ciphertext 230 is stored in any one of the category-specific DB units 391 or the unclassified DB unit 392 of the data search server 300.

Figure 13:
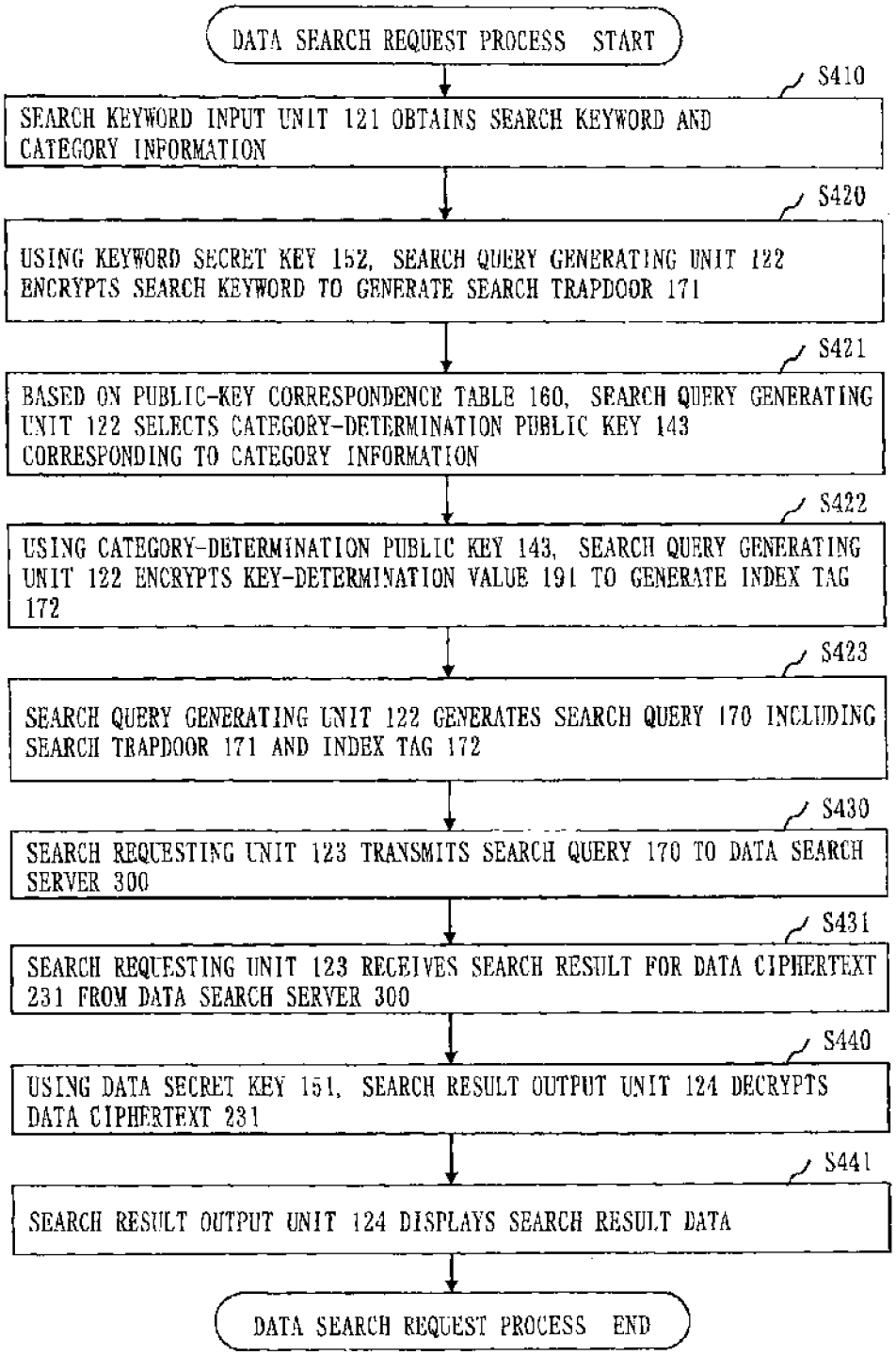
FIG. 13 is a flowchart illustrating a data search request process of the data search terminal 100 in Embodiment 1.

FIG. 13 is the flowchart illustrating the data search request process of the data search terminal 100 in Embodiment 1.

Referring to FIG. 13, the data search request process of the data search terminal 100 in Embodiment 1 will be described.

The searcher activates the search request processing unit 120 of the data search terminal 100, and the search request processing unit 120 of the data search terminal 100 executes the data search request process (S410 to S441) described below.

In S410, using the input device, the searcher inputs to the search keyword input unit 121 of the data search terminal 100 a search keyword and category information indicating a search target category. That is, the search keyword input unit 121 obtains from the input device the search keyword and the category information that are specified by the searcher.

After S410, processing proceeds to S420.

In S420, the search query generating unit 122 obtains the keyword secret key 152 from the search-terminal storage unit 190, and encrypts the search keyword input in S410 using the obtained keyword secret key 152. The encrypted search keyword will be hereinafter referred to as a "search trapdoor 171".

After S420, processing proceeds to S421.

In S421, the search query generating unit 122 refers to the public-key correspondence table 160 stored in the search-terminal storage unit 190, and selects a category-determination public key 143 associated with the category indicated by the category information input in S410, from among the plurality of the category-determination public keys 143 indicated in the public-key correspondence table 160.

After S421, processing proceeds to S422.

In S422, the search query generating unit 122 obtains the key-determination value 191 from the search-terminal storage unit 190, and encrypts the obtained key-determination value 191 using the category-determination public key 143 selected in S421. The encrypted key-determination value 191 will be hereinafter referred to as an "index tag 172".

After S422, processing proceeds to S423.

In S423, the search query generating unit 122 generates a search query 170 (see FIG. 5) including the search trapdoor 171 generated in S420 and the index tag 172 generated in S422.

After S423, processing proceeds to S430.

In S430, the search requesting unit 123 transmits the search query 170 generated in S423 to the data search server 300.

After S430, processing proceeds to S431.

In S431, the search requesting unit 123 receives a search result transmitted from the data search server 300. The search result is data including a data ciphertext 231 corresponding to the search query 170 (in other words, "data ciphertext 231 that satisfies a search condition" or "data ciphertext 231 that has been found as a hit in the search process").

After S431, processing proceeds to S440.

In S440, the search result output unit 124 obtains the data secret key 151 from the search-terminal storage unit 190, and decrypts the data ciphertext 231 included in the search result received in S431 using the obtained data secret key 151. By decrypting the data ciphertext 231, data before being encrypted can be obtained.

After S440, processing proceeds to S441.

In S441, the search result output unit 124 outputs a search result including the data obtained in S440. For example, the search result output unit 124 displays the search result on a display.

S441 completes the data search request process.

Figure 14:
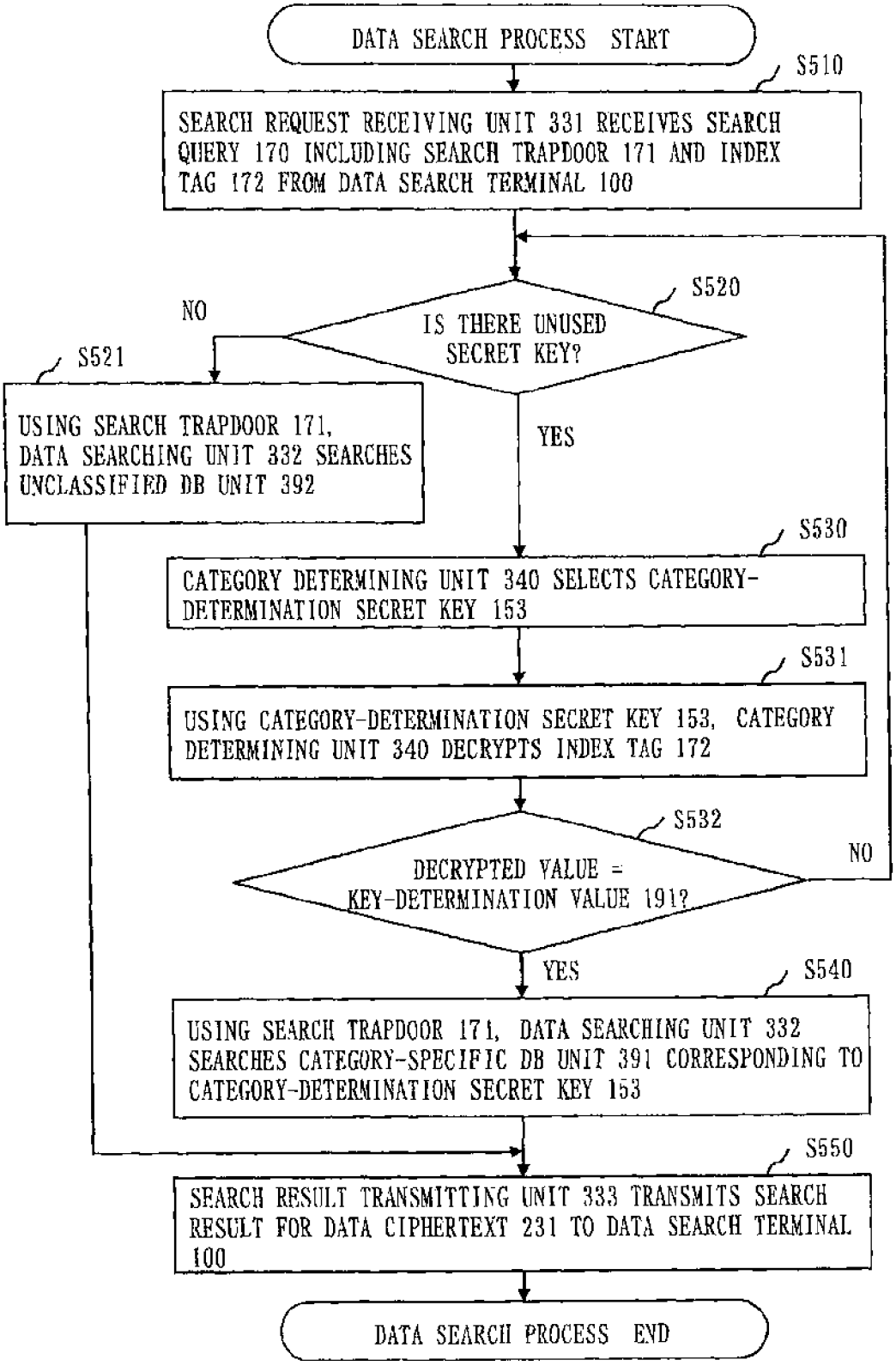
FIG. 14 is a flowchart illustrating a data search process of the data search server 300 in Embodiment 1.

FIG. 14 is the flowchart illustrating the data search process of the data search server 300 in Embodiment 1.

Referring to FIG. 14, the data search process of the data search server 300 in Embodiment 1 will be described.

In S510, the search request receiving unit 331 receives the search query 170 transmitted from the data search terminal 100. The search query 170 is data including the search trapdoor 171 and the index tag 172 (see FIG. 5).

After S510, processing proceeds to S520.

In S520, the category determining unit 340 determines whether or not there is any unselected category-determination secret key 153 which has not been selected in S530 to be described later in the search-server storage unit 390.

If there is any unselected category-determination secret key 153 (YES), processing proceeds to S530.

If there is no unselected category-determination secret key 153 (NO), processing proceeds to S521.

In S530, the category determining unit 340 selects one unselected category-determination secret key 153 from the search-server storage unit 390, and obtains the selected category-determination secret key 153 from the search-server storage unit 390.

After S530, processing proceeds to S531.

In S531, the category determining unit 340 obtains the index tag 172 from the search query 170 received in S510, and decrypts the obtained index tag 172 using the category-determination secret key 153 obtained in S530. A value obtained by decrypting the index tag 172 will be hereinafter referred to as a decrypted value of the index tag 172.

After S531, processing proceeds to S532.

In S532, the category determining unit 340 compares the decrypted value of the index tag 172 obtained in S531 with the key-determination value 191 stored in the search-server storage unit 390.

If the decrypted value of the index tag 172 is equal to the key-determination value 191 (YES), processing proceeds to S540.

If the decrypted value of the index tag 172 is different from the key-determination value 191 (NO), processing returns to S520.

In S540, the data searching unit 332 refers to the secret-key correspondence table 350 (see FIG. 9) stored in the search-server storage unit 390, and selects, as a search target DB unit, a category-specific DB unit 391 associated with the category-determination secret key 153 selected in S530, from among the plurality of the category-specific DB units 391 indicated in the secret-key correspondence table 350.

Then, the data searching unit 332 obtains the search trapdoor 171 from the search query 170 received in S510, and searches the search target category-specific DB unit 391 using the obtained search trapdoor 171, in accordance with a search algorithm of a PEKS scheme.

For example, the data searching unit 332 performs a search as described below.

The data searching unit 332 selects a system ciphertext 230 one by one from the search target category-specific DB unit 391, and obtains a keyword ciphertext 232 from the selected system ciphertext 230.

Using the keyword ciphertext 232 and the search trapdoor 171 as input data, the data searching unit 332 executes the search algorithm (search program) of the PEKS scheme.

Based on the result of execution of the search algorithm, the data searching unit 332 determines whether the data keyword before being encrypted into the keyword ciphertext 232 matches the search keyword before being encrypted into the search trapdoor 171. If the data keyword of the keyword ciphertext 232 matches the search keyword of the search trapdoor 171, the data ciphertext 231 that is included in the system ciphertext 230 together with this keyword ciphertext 232 is the data ciphertext 231 that has been found as a hit in the search process.

After S540, processing proceeds to S550.

In S521, the data searching unit 332 obtains the search trapdoor 171 from the search query 170 received in S510, and searches the unclassified DB unit 392 using the obtained search trapdoor 171 in accordance with the search algorithm of the PEKS scheme. That is, the data searching unit 332 performs a search process on the unclassified DB unit 392 instead of the category-specific DB units 391. The search method is the same as in S540.

After S521, processing proceeds to S550.

In S550, the search result transmitting unit 333 transmits to the data search terminal 100 a search result including the data ciphertext 231 that has been found as a hit in the search process in S540 or S521.

S550 completes the data search process.

Through the data search process shown in FIG. 14, the data search server 300 can perform a search using the PEKS scheme on the category-specific DB unit 391 of the category specified by the searcher (or the unclassified DB unit 392). That is, the data search server 300 can perform a keyword search with the data, the search keyword and the search target category being kept secret. Furthermore, by performing a search on the category-specific DB unit 391 of the category specified by the searcher (or the unclassified DB unit 392), the data search server 300 can reduce search time compared to when a search is performed on all the data ciphertexts 231.

Figure 15:
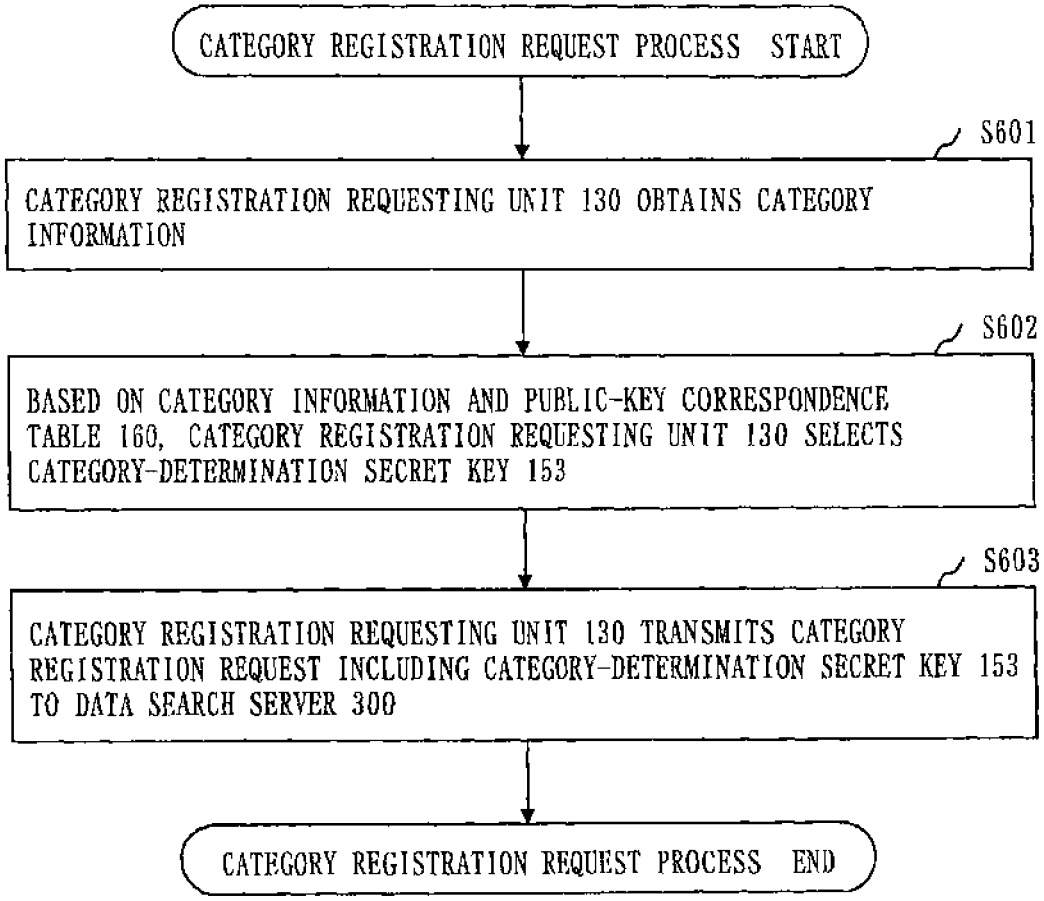
FIG. 15 is a flowchart illustrating a category registration request process of the data search terminal 100 in Embodiment 1.

FIG. 15 is the flowchart illustrating the category registration request process of the data search terminal 100 in Embodiment 1.

Referring to FIG. 15, the category registration request process of the data search terminal 100 in Embodiment 1 will be described.

In S601, using the input device, the searcher inputs to the category registration requesting unit 130 of the data search terminal 100 category information indicating a category into which the searcher wishes to classify a system ciphertext 230 that is unclassified. That is, the category registration requesting unit 130 obtains from the input device the category information specified by the searcher.

After S601, processing proceeds to S602.

In S602, the category registration requesting unit 130 refers to the public-key correspondence table 160 (see FIG. 4) stored in the search-terminal storage unit 190, and selects a category-determination secret key 153 associated with the category indicated in the category information input in S601, from among the plurality of the category-determination secret keys 153 indicated in the public-key correspondence table 160.

After S602, processing proceeds to S603.

In S603, the category registration requesting unit 130 obtains from the search-terminal storage unit 190 the category-determination secret key 153 selected in S602, and transmits to the data search server 300 a category registration request including the obtained category-determination secret key 153.

S603 completes the category registration request process.

Figure 16:
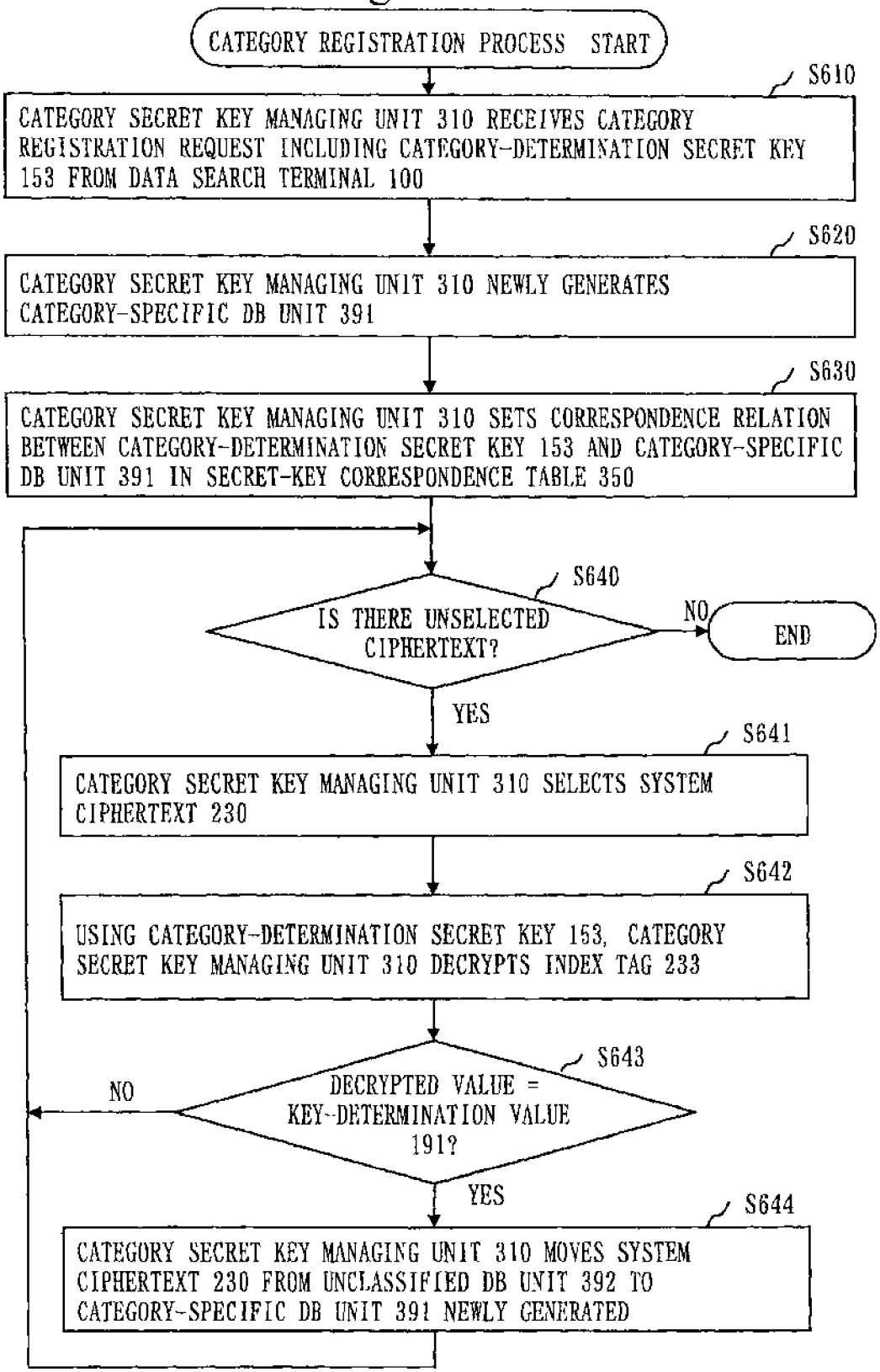
FIG. 16 is a flowchart illustrating a category registration process of the data search server 300 in Embodiment 1.

FIG. 16 is the flowchart illustrating the category registration process of the data search server 300 in Embodiment 1.

Referring to FIG. 16, the category registration process of the data search server 300 in Embodiment 1 will be described.

In S610, the category secret key managing unit 310 receives the category registration request transmitted from the data search terminal 100. The category registration request is data including the category-determination secret key 153.

The category secret key managing unit 310 obtains the category-determination secret key 153 from the received category registration request, and stores the obtained category-determination secret key 153 in the search-server storage unit 390.

After S610, processing proceeds to S620.

In S620, the category secret key managing unit 310 newly generates a category-specific DB unit 391.

After S620, processing proceeds to S630.

In S630, the category secret key managing unit 310 associates the category-determination secret key 153 obtained in S610 with the category-specific DB unit 391 generated in S620, and sets them in the secret-key correspondence table 350 (see FIG. 9).

After S630, processing proceeds to S640.

In S640, the category secret key managing unit 310 determines whether or not there is any unselected system ciphertext 230 which has not been selected in S641 to be described later in the unclassified DB unit 392.

If there is any unselected system ciphertext 230 in the unclassified DB unit 392 (YES), processing proceeds to S641.

If there is no unselected system ciphertext 230 in the unclassified DB unit 392 (NO), the category registration process ends.

In S641, the category secret key managing unit 310 selects one unselected system ciphertext 230 from the unclassified DB unit 392, and obtains the selected system ciphertext 230 from the unclassified DB unit 392.

After S641, processing proceeds to S642.

In S642, the category secret key managing unit 310 obtains an index tag 233 from the system ciphertext 230 selected in S641, and decrypts the obtained index tag 233 using the category-determination secret key 153 obtained in S610. A value obtained by decrypting the index tag 233 will be hereinafter referred to as a decrypted value of the index tag 233.

After S642, processing proceeds to S643.

In S643, the category secret key managing unit 310 compares the decrypted value of the index tag 233 obtained in S642 with the key-determination value 191 stored in the search-server storage unit 390.

If the decrypted value of the index tag 233 is equal to the key-determination value 191 (YES), processing proceeds to S644.

If the decrypted value of the index tag 233 is different from the key-determination value 191 (NO), processing returns to S640.

In S644, the category secret key managing unit 310 moves the system ciphertext 230 selected in S641, from the unclassified DB unit 392 to the category-specific DB unit 391 newly generated in S620.

After S644, processing returns to S640.

Through the category registration request process shown in FIG. 15 and the category registration process shown in FIG. 16, a category-specific DB unit 391 for a new category is generated, and a system ciphertext 230 classified into the new category is stored in the generated category-specific DB unit 391.

Figure 17:
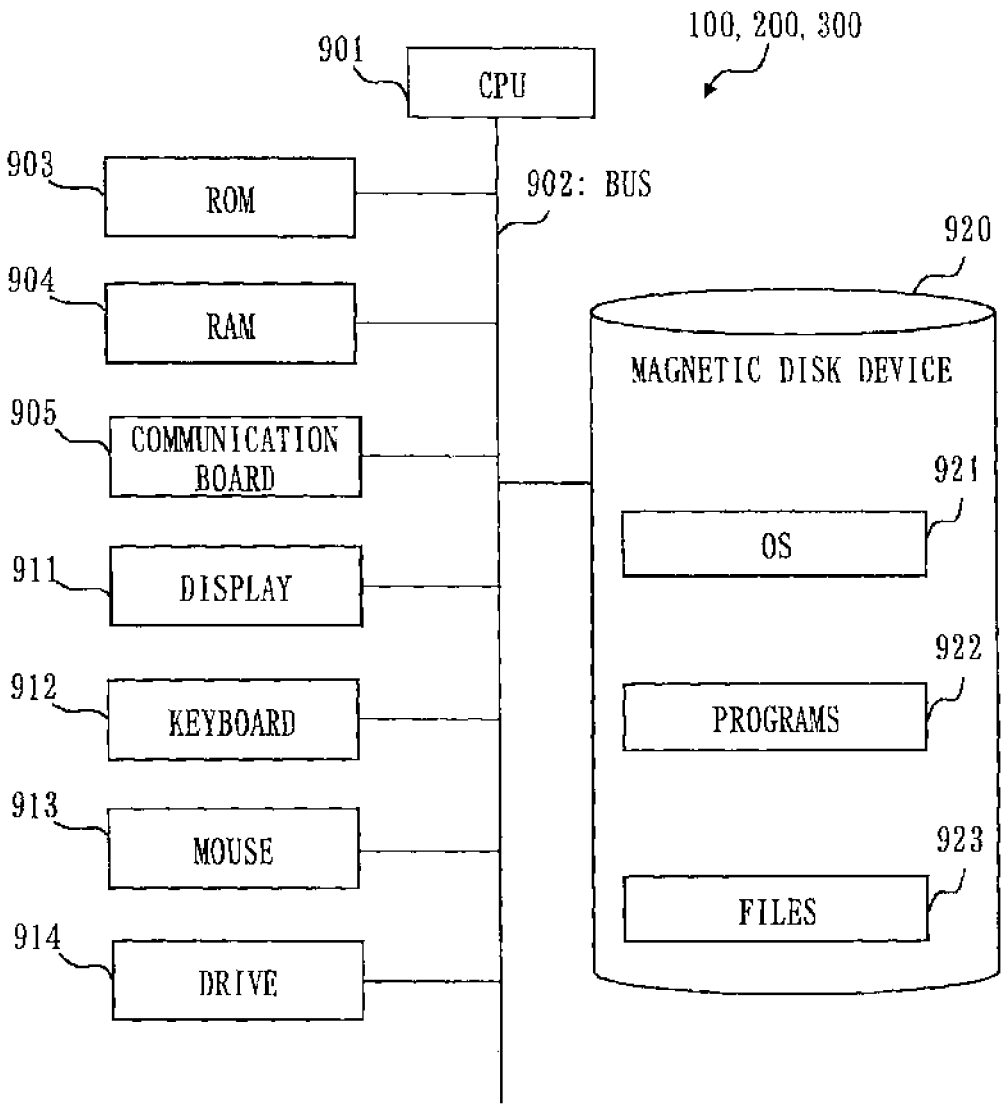
FIG. 17 is a diagram illustrating an example of hardware resources of the data search system 900 in Embodiment 1.

FIG. 17 is a diagram illustrating an example of hardware resources of the data search system 900 in Embodiment 1.

In FIG. 17, each of the data search terminal 100, the data registration terminal 200, and the data search server 300 (an example of a computer, respectively) includes a CPU 901 (Central Processing Unit). The CPU 901 is connected via a bus 902 to hardware devices such as a ROM 903, a RAM 904, a communication board 905, a display 911 (display device), a keyword 912, a mouse 913, a drive 914, and a magnetic disk device 920, and controls these hardware devices. The drive 914 is a device for reading from and writing to a storage medium such as an FD (Flexible Disk Drive), a CD (Compact Disc), or a DVD (Digital Versatile Disc).

The ROM 903, the RAM 904, the magnetic disk device 920, and the drive 914 are examples of a storage device. The keyboard 912, the mouse 913, and the communication board 905 are examples of an input device. The display 911 and the communication board 905 are examples of an output device.

The communication board 905 is connected in a wired or wireless manner to a communication network such as a LAN (Local Area Network), the Internet, or a telephone line.

The magnetic disk device 920 stores an OS 921 (operating system), programs 922, and files 923.

The programs 922 include programs that execute functions described as "units" in the embodiments. The programs (e.g., a data search program, a data registration program, an information processing program) are read and executed by the CPU 901. That is, each program causes the computer to function as each "unit", or causes the computer to execute a procedure or a method of each "unit".

The files 923 include various types of data (input, output, determination result, computation result, processing result, etc.) used in the "units" described in the embodiments.

In the embodiments, arrows included in the configuration diagrams and the flowcharts mainly denote inputs and outputs of data and signals.

The processes of the embodiments described with reference to the flowcharts or the like are executed using the hardware such as the CPU 901, the storage device, the input device, and the output device.

In the embodiments, what is described as a "unit" may be a "circuit", "device" or "equipment", and may also be a "step", "procedure", or "process". That is, what is described as a "unit" may be implemented by firmware, software, hardware, or a combination of these.

The data search system 900 in Embodiment 1 has, for example, the following features.

(1) An index tag is added to each of a ciphertext (system ciphertext 230) and a search query (see FIGS. 5 and 7).

(2) By publishing a secret key (category-determination secret key 153) to the data search server 300, specific data corresponding to the secret key is separated from the whole.

(3) The index tag in the search query is decrypted with the secret key. Based on this result, the scope to be searched is limited (see FIG. 14.).

(4) By combining the above (1) to (3), performing a search on the entire data can be avoided, so that a faster search can be performed.

The data search system 900 in Embodiment 1 can provide, for example, the following effects.

(1) There is an effect in that a faster search can be achieved in PEKS.

(2) There is an effect in that a faster search can be performed by targeting at specific data (e.g., data in a given category).

(3) There is an effect in that a searcher can adaptively increase categories for achieving a faster search (see FIGS. 15 and 16).

(4) There is an effect in that by using a public-key encryption scheme with key-privacy, such as ElGamal encryption or Cramer-Shoup encryption, as public-key encryption used for creating an index tag, a faster search can be achieved with category information of each ciphertext being kept secret to the data search server 300. There is also an effect in that by using a public-key encryption scheme without key-privacy, options for selecting a public-key encryption scheme can be increased.

(5) There is an effect in that with a configuration in which category-determination key pairs (see FIG. 3) and index tags (see FIGS. 5 and 7) are additionally provided (provided as add-ons), implementation can be achieved without greatly changing an existing PEKS. By this, there is an effect in that the cost of implementation can be reduced.

The data search system 900 in Embodiment 1 may be configured as described below.

(1) Each system ciphertext 230 may include a plurality of index tags 233. In this case, the registering person specifies (inputs) a plurality of category information to the data registration terminal 200. Then, the data registration terminal 200 generates an index tag 233 for each of the specified categories, and sets a plurality of generated index tags 233 in the system ciphertext 230. The data search server 300 stores the system ciphertext 230 in a plurality of category-specific DB units 391 corresponding to the plurality of index tags 233 included in the system ciphertext 230. With this arrangement, data covering a plurality of categories can be supported.

(2) In Embodiment 1, an example has been presented in which a constant (e.g., "1") is used as a plaintext (key-determination value 191) of the index tag. Alternatively, a plaintext depending on search target data or a keyword may be used.

For example, a hash value of the keyword ciphertext 232 (see FIG. 7) may be used as the plaintext of the index tag. With this arrangement, a correspondence is generated between the keyword ciphertext 232 and the index tag, so that a resistance against data exchange attacks on a communication path can be provided. In this case, the data search terminal 100, the data registration terminal 200, and the data search server 300 compute and use the hash value of the keyword ciphertext 232 instead of using the key-determination value 191.

(3) A plurality of key-determination values 191 may be used to provide detailed classification categories. By providing detailed classification categories, a faster search can be achieved.

For example, the data search system 900 operates as described below.

The data search terminal 100 generates a key-determination-value correspondence table 192 as shown in FIG. 18, and provides the generated key-determination-value correspondence table 192 to the data registration terminal 200 and the data search server 300.

The user specifies a large category and a small category to the data search terminal 100 and the data registration terminal 200, and the data search terminal 100 and the data registration terminal 200 use the key-determination values 191 corresponding to the large category and the small category.

The data search server 300 generates a category-specific DB unit 391 for each large category (for each category-determination secret key 153), and stores system ciphertexts 230 according to small categories within each category-specific DB unit 391. For example, within a category-specific DB unit 391, the data search server 300 separately manages a system ciphertext 230 having "11" as a decrypted value of the index tag 233 and a system ciphertext 230 having "12" as a decrypted value of the index tag 233.

FIG. 18 is a diagram illustrating the key-determination-value correspondence table 192 in Embodiment 1. As shown in FIG. 18, the key-determination-value correspondence table 192 is data associating a large category, a small category, and a key-determination value 191. Categories may be classified into three or more levels (e.g., large, middle, small).

(4) In Embodiment 1, the method for adaptively increasing categories (see FIGS. 15 and 16) has been presented. Alternatively, categories may be adaptively reduced.

For example, the searcher operates the data search terminal 100 to transmit a category delete request to the data search server 300. The category delete request is data specifying a category-determination secret key 153 of a category to be deleted. In accordance with the delete request, the data search server 300 deletes the category-determination secret key 153, and takes out and moves system ciphertexts 230 from the category-specific DB unit 391 corresponding to the category-determination secret key 153 to the unclassified DB unit 392, and deletes the category-specific DB unit 391.

(5) In Embodiment 1, an example has been presented in which a predetermined number of key pairs of the category-determination public keys 143 and the category-determination secret keys 153 are generated. Alternatively, a key pair of the category-determination public keys 143 and the category-determination secret keys 153 may be added as required.

For example, when the searcher wishes to add a category, the searcher inputs additional category information to the data search terminal 100. In this case, based on the additional category information, the data search terminal 100 newly generates a key pair of a category-determination public key 143 and a category-determination secret key 153, updates the public-key correspondence table 160, and provides the category-determination public key 143, the category-determination secret key 153, and the public-key correspondence table 160 to the data registration terminal 200 and the data search server 300, as in the setup process.

(6) In Embodiment 1, an example has been presented in which system ciphertexts 230 are classified according to categories related to the contents of data (data ciphertexts 231) and keywords (keyword ciphertexts 232) (e.g., "patent", "design"). Alternatively, system ciphertexts 230 may be classified according to other attributes of data (creation date, data size, etc.) With this arrangement, system ciphertexts 230 can be managed according to the attributes (types) of data, and a faster search can be achieved.

FIG. 19 is a diagram illustrating another example of the public-key correspondence table 160 in Embodiment 1.

For example, the data search terminal 100 generates a public-key correspondence table 160 as shown in FIG. 19, and provides the public-key correspondence table 160 generated to the data registration terminal 200. The data registration terminal 200 generates an index tag 233 of a system ciphertext 230 by using a category-determination public key 143 associated with a creation date of the system ciphertext 230 among a plurality of the category-determination public keys 143 indicated in the public-key correspondence table 160. The searcher inputs to the data search terminal 100 a creation date of data the searcher wishes to obtain. Then, the data search terminal 100 generates an index tag 172 of a search query 170 by using a category-determination public key 143 associated with the input creation date of the data among the plurality of the category-determination public keys 143 indicated in the public-key correspondence table 160.

(7) In place of the public-key encryption scheme (or PEKS), another encryption scheme (e.g., symmetric-key encryption scheme) may be employed. Alternatively, data and keywords that have not been encrypted may be registered as required.

In Embodiment 1, the data search system 900 as described below, for example, has been described.

A data search device (data search server 300) includes a data storage unit, a key-determination information storage unit, a search condition input unit, a data group selecting unit, a data searching unit, and a search result output unit.

The data storage unit (storage device) is configured to store a plurality of data groups (category-specific DB units 391), each data group including one or more pieces of data (system ciphertexts 230), and a plurality of decryption keys (category-determination secret keys 153) for decrypting encrypted information, by associating each of the plurality of the data groups with each of the plurality of the decryption keys.

The key-determination information storage unit (search-server storage unit 390) is configured to store key-determination information (key-determination value 191) for determining a decryption key.

The search condition input unit (search request receiving unit 331) is configured to obtain a search condition (search trapdoor 171) for searching for data, and obtain encrypted information (index tag 172) generated by encrypting predetermined information (key-determination value 191).

The data group selecting unit (category determining unit 340) is configured to decrypt the encrypted information obtained by the search condition input unit by using each of the plurality of the decryption keys stored in the data storage unit. The data group selecting unit is configured to select a decryption key with which the encrypted information is decrypted to same information as the key-determination information, from among the plurality of the decryption keys. The data group selecting unit is configured to select as a search target group a data group associated with the decryption key selected, from among the plurality of the data groups stored in the data storage unit;

The data searching unit (data searching unit 332) is configured to obtain as search result data a piece of data that satisfies the search condition obtained by the search condition input unit, from among the one or more pieces of data included in the search target group selected by the data group selecting unit.

The search result output unit (search result transmitting unit 333) is configured to output the search result data obtained by the data searching unit.

The data search device further includes a new data input unit and a new data registering unit.

The new data input unit (registration request receiving unit 321) is configured to obtain new data (data ciphertext 231) and an encrypted tag (index tag 233) generated by encrypting predetermined information (key-determination value 191).

The new data registering unit (data registering unit 322) is configured to add the new data obtained by the new data input unit to a registration target group which is selected from among the plurality of the data groups by the data group selecting unit.

The data group selecting unit is configured to decrypt the encrypted tag obtained by the new data input unit by using each of the plurality of the decryption keys. The data group selecting unit is configured to select a decryption key with which the encrypted tag is decrypted to the same information as the key-determination information, from among the plurality of the decryption keys. The data group selecting unit is configured to select as the registration target group a data group associated with the decryption key selected, from among the plurality of the data groups.

The data storage unit (storage device) is configured to further store an unclassified group (unclassified DB unit 392) as a data group including a plurality of pieces of data and a plurality of encrypted tags generated by encrypting the predetermined information, each of the plurality of the pieces of data being associated with each of the plurality of the encrypted tags.

The data search device further includes an additional decryption key input unit and a data group registering unit.

The additional decryption key input unit (category secret key managing unit 310) is configured to obtain a new decryption key (category-determination secret key 153) as an additional decryption key.

The data group registering unit (category secret key managing unit 310) is configured to decrypt the plurality of the encrypted tags included in the unclassified group by using the additional decryption key obtained by the additional decryption key input unit. The data group registering unit is configured to select an encrypted tag which is decrypted to the same information as the key-determination information, from among the plurality of the encrypted tags. The data group registering unit is configured to extract a piece of data associated with the encrypted tag selected, from among the plurality of the pieces of data included in the unclassified group, and generate an additional group including the piece of data extracted, as a new data group to be added to the plurality of the data groups. The data group registering unit is configured to store the additional group generated and the additional decryption key in the data storage unit by associating the additional group generated with the additional decryption key.

A data registration device (data registration terminal 200) includes a data generating unit, a classification information input unit, an encrypted tag generating unit, and a data registration requesting unit.

The data generating unit (data ciphertext generating unit 222) is configured to generate data (data ciphertext 231).

The classification information input unit (registration information input unit 221) is configured to obtain classification information indicating a classification of the data generated by the data generating unit.

The encrypted tag generating unit (index tag generating unit 224) is configured to generate an encrypted tag (index tag 233) by encrypting predetermined information (key-determination value 191) based on the classification information obtained by the classification information input unit.

The data registration requesting unit (data registration requesting unit 225) is configured to transmit to a data search device (data search server 300) the data generated by the data generating unit and the encrypted tag generated by encrypted tag generating unit. The data registration requesting unit thereby causes the data search device to execute a process of adding the data to a data group of the classification indicated by the classification information, as search target data.

The data registration device further includes an encryption key storage unit (registration-terminal storage unit 290) configured to store a plurality of encryption keys (category-determination public keys 143) and a plurality of pieces of classification information (category information) by associating each the plurality of the encryption keys with each of the plurality of the pieces of classification information.

The encrypted tag generating unit is configured to select an encryption key associated with same classification information as the classification information obtained by the classification information input unit, from among the plurality of the encryption keys stored in the encryption key storage unit, and generate the encrypted tag by encrypting the predetermined information by using the encryption key selected.

An information processing device (data search terminal 100) includes a search condition input unit, an encrypted tag generating unit, and a data search requesting unit. The search condition input unit (search keyword input unit 121) is configured to obtain a search condition (search keyword) for searching for data (data ciphertext 231), and obtain classification information (category information) indicating a classification of the data.

The encrypted tag generating unit (search query generating unit 122) is configured to generate an encrypted tag (index tag 172) by encrypting predetermined information (key-determination value 191) based on the classification information obtained by the search condition input unit.

The data search requesting unit (search requesting unit 123) is configured to transmit to a data search device (data search server 300) information of the search condition (search trapdoor 171) obtained by the search condition input unit and the encrypted tag generated by the encrypted tag generating unit. The data search requesting unit is configured to receive as search result data from the data search device a piece of data that satisfies the search condition, from among pieces of data included in a data group of the classification indicated by the classification information.

The information processing device further includes an encryption key storage unit (search-terminal storage unit 190) configured to store a plurality of encryption keys (category-determination public keys 143) and a plurality of pieces of classification information by associating each of the plurality of the encryption keys with each of the plurality of the pieces of classification information.

The encrypted tag generating unit is configured to select an encryption key associated with same classification information as the classification information obtained by the search condition input unit, from among the plurality of the encryption keys stored in the encryption key storage unit, and generate the encrypted tag by encrypting the predetermined information by using the encryption key selected.

Embodiment 2

An embodiment in which ID-based encryption (IBE: Identity-Based Encryption) is employed in place of public-key encryption will be described.

ID-based encryption is an encryption scheme in which an identifier (ID), such as a user name, an IP address, or a mail address, is used as a public key.

Features that are different from Embodiment 1 will be mainly described hereinafter. Features not described are substantially the same as those in Embodiment 1.

A configuration of the data search system 900, and functional configurations of the data search terminal 100, the data registration terminal 200, and the data search server 300 are substantially the same as those in Embodiment 1 (see FIGS. 1, 2, 6, and 8).

However, the data search system 900 differs from that in Embodiment 1 in the following points.

Since the data search system 900 employs ID-based encryption in place of public-key encryption, the public-key correspondence table 160 (see FIG. 4) described in Embodiment 1 is not needed. For this reason, the public-key correspondence table generating unit 112 of the data search terminal 100 is also not needed. Processes will be described in detail later.

Figure 20:
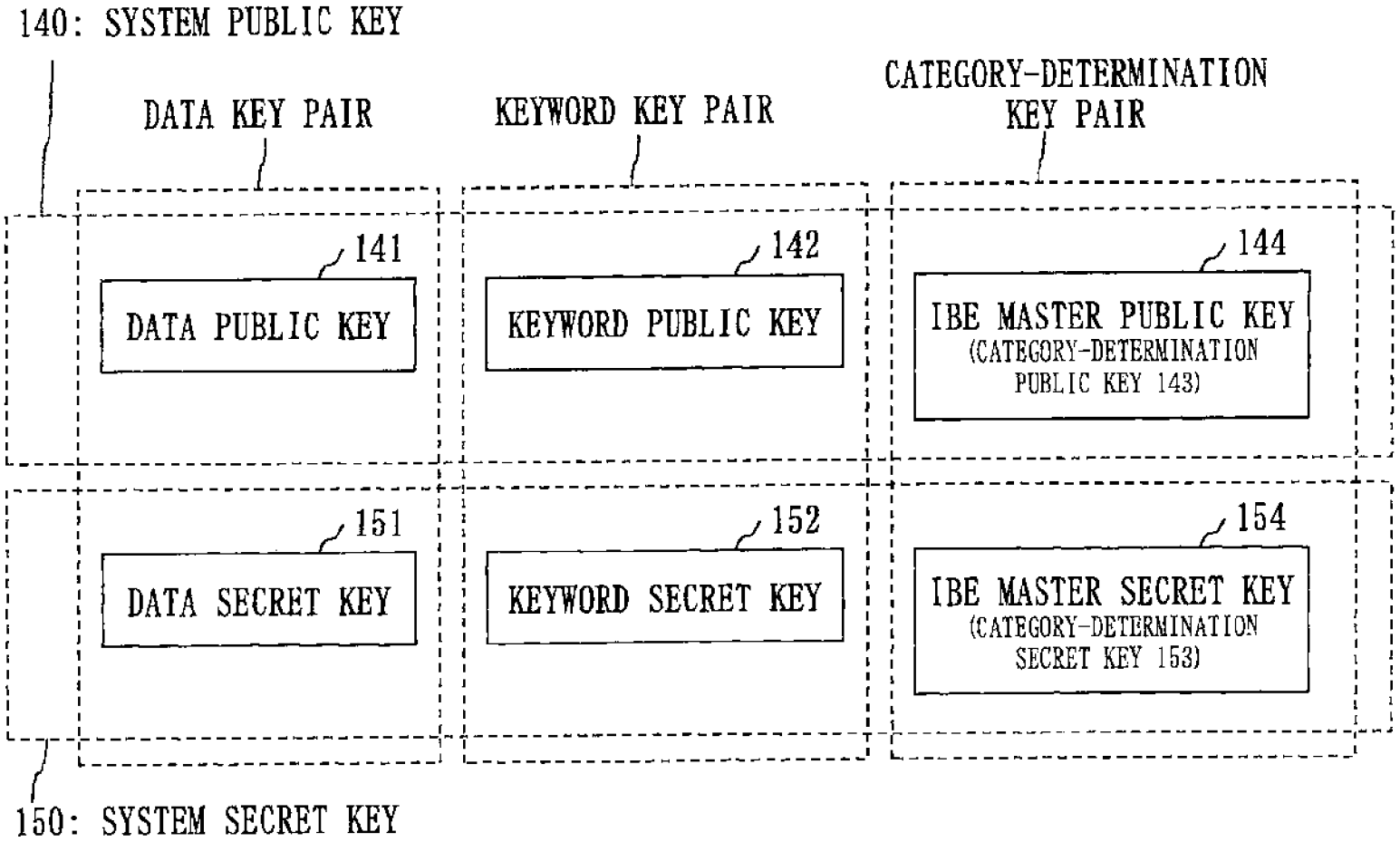
FIG. 20 is a diagram illustrating a system public key 140 and a system secret key 150 in Embodiment 2.

FIG. 20 is a diagram illustrating a system public key 140 and a system secret key 150 in Embodiment 2.

Referring to FIG. 20, the system public key 140 and the system secret key 150 in Embodiment 2 will be described.

The system public key 140 has one IBE master public key 144 in place of a plurality of the category-determination public keys 143 described in Embodiment 1 (see FIG. 3). The IBE master public key 144 is a master public key of ID-based encryption.

The system secret key 150 has one IBE master secret key 154 in place of a plurality of the category-determination secret keys 153 described in Embodiment 1 (see FIG. 3). The IBE master secret key 154 is a master secret key of ID-based encryption.

Figure 21:
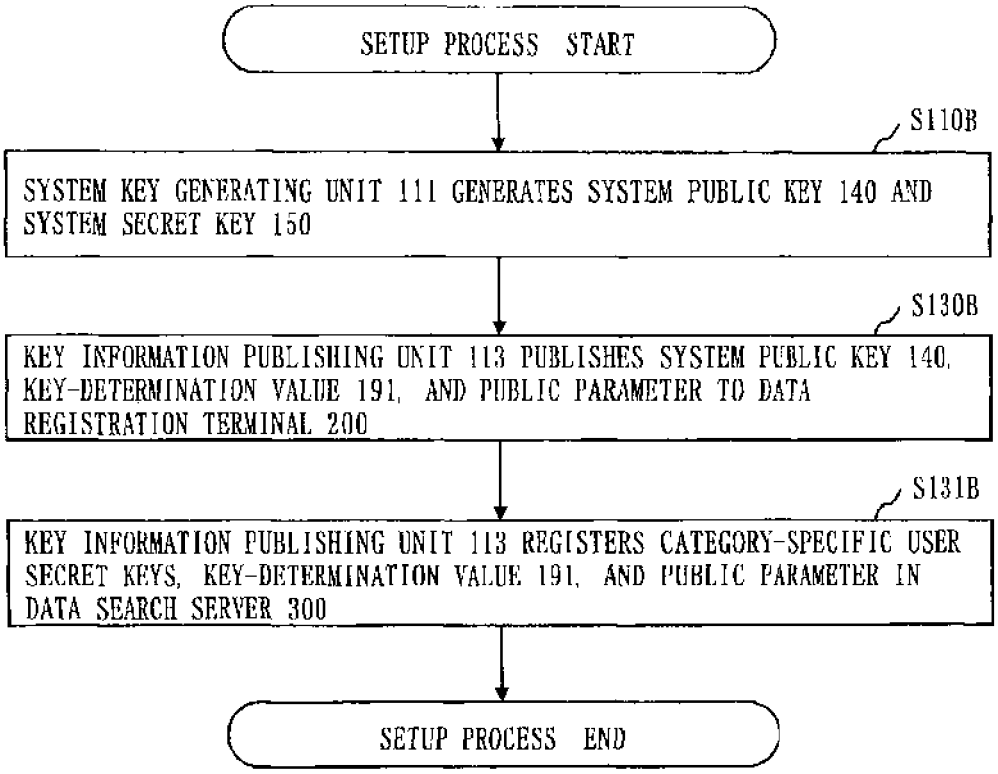
FIG. 21 is a flowchart illustrating a setup process of the data search terminal 100 in Embodiment 2.

FIG. 21 is a flowchart illustrating a setup process of the data search terminal 100 in Embodiment 2.

Referring to FIG. 21, the setup process of the data search terminal 100 in Embodiment 2 will be described.

S110B to S131B to be described below are steps corresponding to S110 to S131 described in Embodiment 1 (see FIG. 10). "B" will be appended as a suffix to a step that is partially different from Embodiment 1.

In S110B, the system key generating unit 111 generates a system public key 140 and a system secret key 150.

As shown in FIG. 20, the system public key 140 includes an IBE master public key 144, and the system secret key 150 includes an IBE master secret key 154.

The system key generating unit 111 executes a master key generation algorithm of an ID-based encryption scheme, and generates a key pair of the IBE master public key 144 and the IBE master secret key 154.

For example, the system key generating unit 111 uses an ID-based encryption scheme with anonymity, such as Boneh-Franklin ID-based encryption (BF-IBE) (see Non-Patent Literature 4) or Boyen-Waters ID-based encryption (BW-IBE) (see Non-Patent Literature 5). Anonymity refers to the property that the ID used as a public key cannot be known by looking at a ciphertext (see Non-Patent Literature 6).

Note that the system key generating unit 111 may use an ID-based encryption scheme without anonymity (e.g., Boneh-Boyen ID-based encryption (BB-IBE)).

After S110B, processing proceeds to S130B.

In S130B, as in S130 in Embodiment 1, the key information publishing unit 113 publishes the system public key 140, a key-determination value 191, and a public parameter of ID-based encryption to the data registration terminal 200. Note that a public-key correspondence table 160 is not needed.

After S130B, processing proceeds to S131B.

In S131B, using the IBE master secret key 154 and category information, the key information publishing unit 113 executes a user secret key generation algorithm of ID-based encryption, and generates category-specific user secret keys. The category information is specified (input) to the data search terminal 100 by a user.

As in S131 in Embodiment 1, the key information publishing unit 113 registers with the data search server 300 the category-specific user secret keys (in place of the category-determination secret keys 153), the key-determination value 191, and the public parameter of ID-based encryption. The data search server 300 generates a secret-key correspondence table 350 associating each category-specific user secret key with a category-specific DB unit 391.

S131B completes the setup process.

Figure 22:
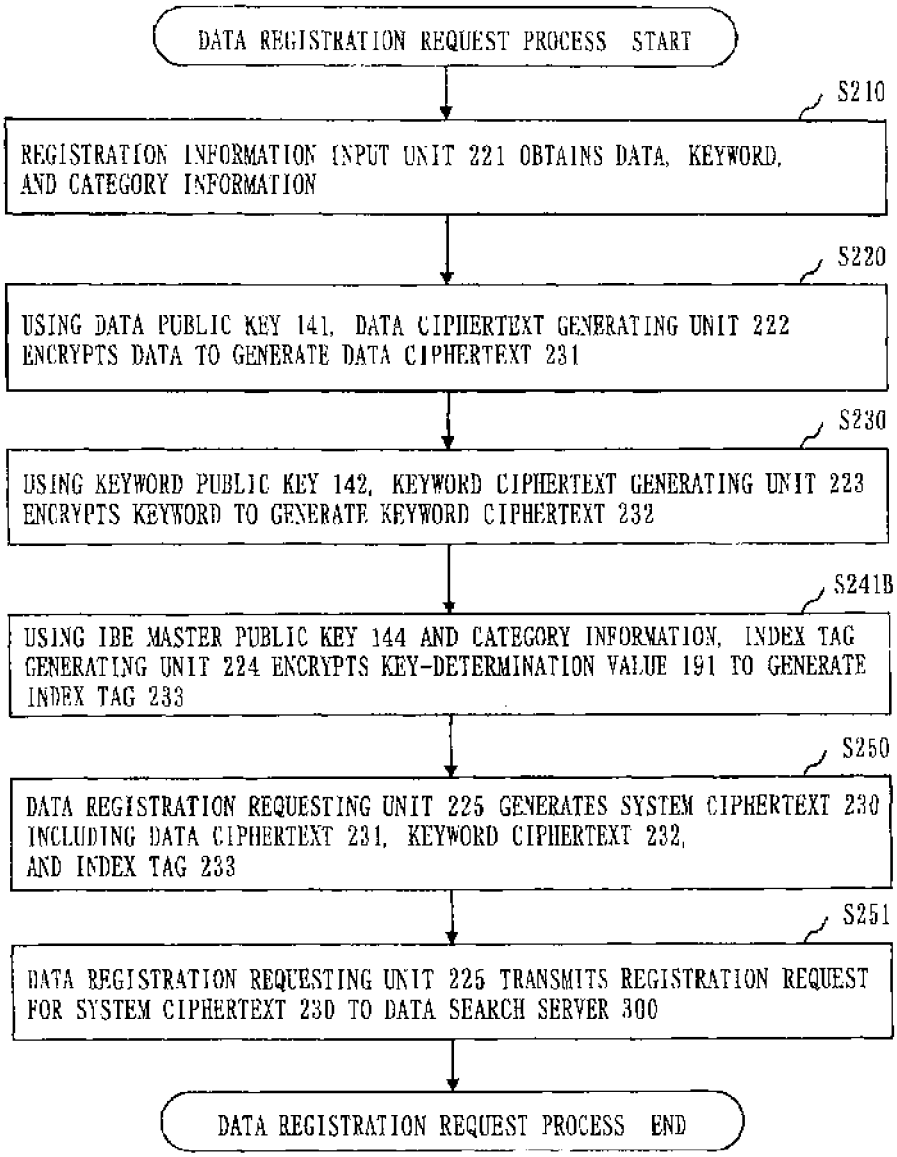
FIG. 22 is a flowchart illustrating a data registration request process of the data registration terminal 200 in Embodiment 2.

FIG. 22 is a flowchart illustrating a data registration request process of the data registration terminal 200 in Embodiment 2.

Referring to FIG. 22, the data registration request process of the data registration terminal 200 in Embodiment 2 will be described.

S210 to S251 to be described below are steps corresponding to S210 to S251 described in Embodiment 1 (see FIG. 11). "B" will be appended as a suffix to a step that is partially different from Embodiment 1.

S210 to S230 are the same as in Embodiment 1. After S230, processing proceeds to S241B.

In S241B, using the IBE master public key 144 and the category information, the index tag generating unit 224 executes an encryption algorithm of ID-based encryption, and generates an index tag 233 by encrypting the key-determination value 191. That is, using the IBE master public key 144, the index tag generating unit 224 encrypts the key-determination value 191. The category information is used as a parameter.

After S241B, processing proceeds to S250.

S250 and S251 are the same as in Embodiment 1. S251 completes the data registration request process.

Figure 23:
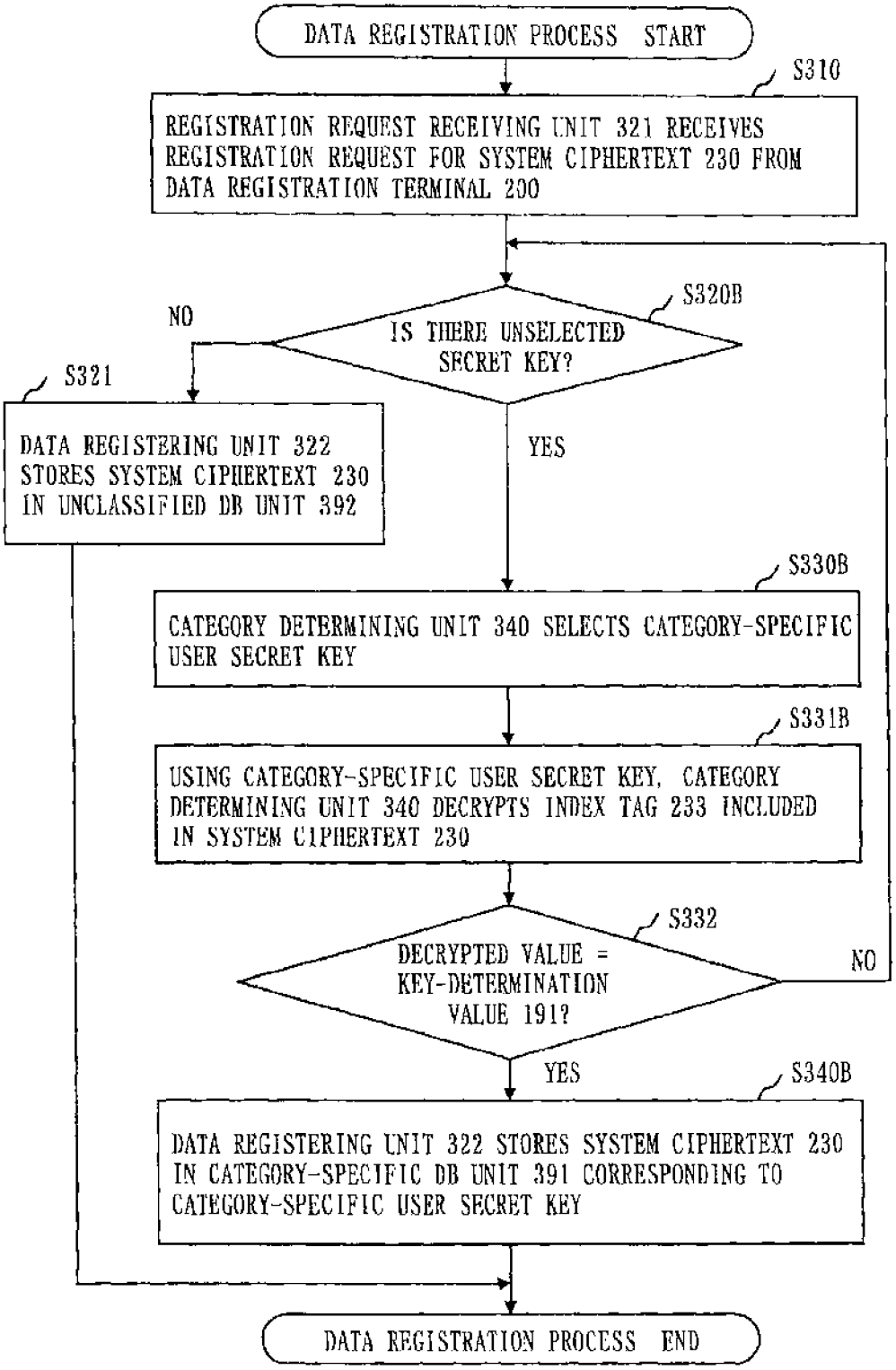
FIG. 23 is a flowchart illustrating a data registration process of the data search server 300 in Embodiment 2.

FIG. 23 is a flowchart illustrating a data registration process of the data search server 300 in Embodiment 2.

Referring to FIG. 23, the data registration process of the data search server 300 in Embodiment 2 will be described.

S310 to S340B to be described below are steps corresponding to S310 to S340 described in Embodiment 1 (see FIG. 12). "B" will be appended as a suffix to a step that is partially different from Embodiment 1.

In S310, the registration request receiving unit 321 receives a registration request for a system ciphertext 230 from the data registration terminal 200.

After S310, processing proceeds to S320B.

In S320B, the category determining unit 340 determines whether or not there is any unselected category-specific user secret key which has not been selected in S330B to be described later in the search-server storage unit 390.

If there is any unselected category-specific user secret key (YES), processing proceeds to S330B.

If there is no unselected category-specific user secret key (NO), processing proceeds to S321. In S321, the data registering unit 322 stores the system ciphertext 230 in the unclassified DB unit 392.

In S330B, the category determining unit 340 selects one unselected category-specific user secret key from the search-server storage unit 390.

After S330B, processing proceeds to S331B.

In S331B, using the category-specific user secret key selected in S330B, the category determining unit 340 decrypts the index tag 233 included in the system ciphertext 230.

After S331B, processing proceeds to S332.

In S332, the category determining unit 340 compares the decrypted value of the index tag 233 obtained in S331B with the key-determination value 191.

If the decrypted value of the index tag 233 is equal to the key-determination value 191 (YES), processing proceeds to S340B.

If the decrypted value of the index tag 233 is different from the key-determination value 191 (NO), processing returns to S320B.

In S340B, the data registering unit 322 stores the system ciphertext 230 in the category-specific DB unit 391 corresponding to the category-specific user secret key selected in S330B.

S340B completes the data registration process.

Figure 24:
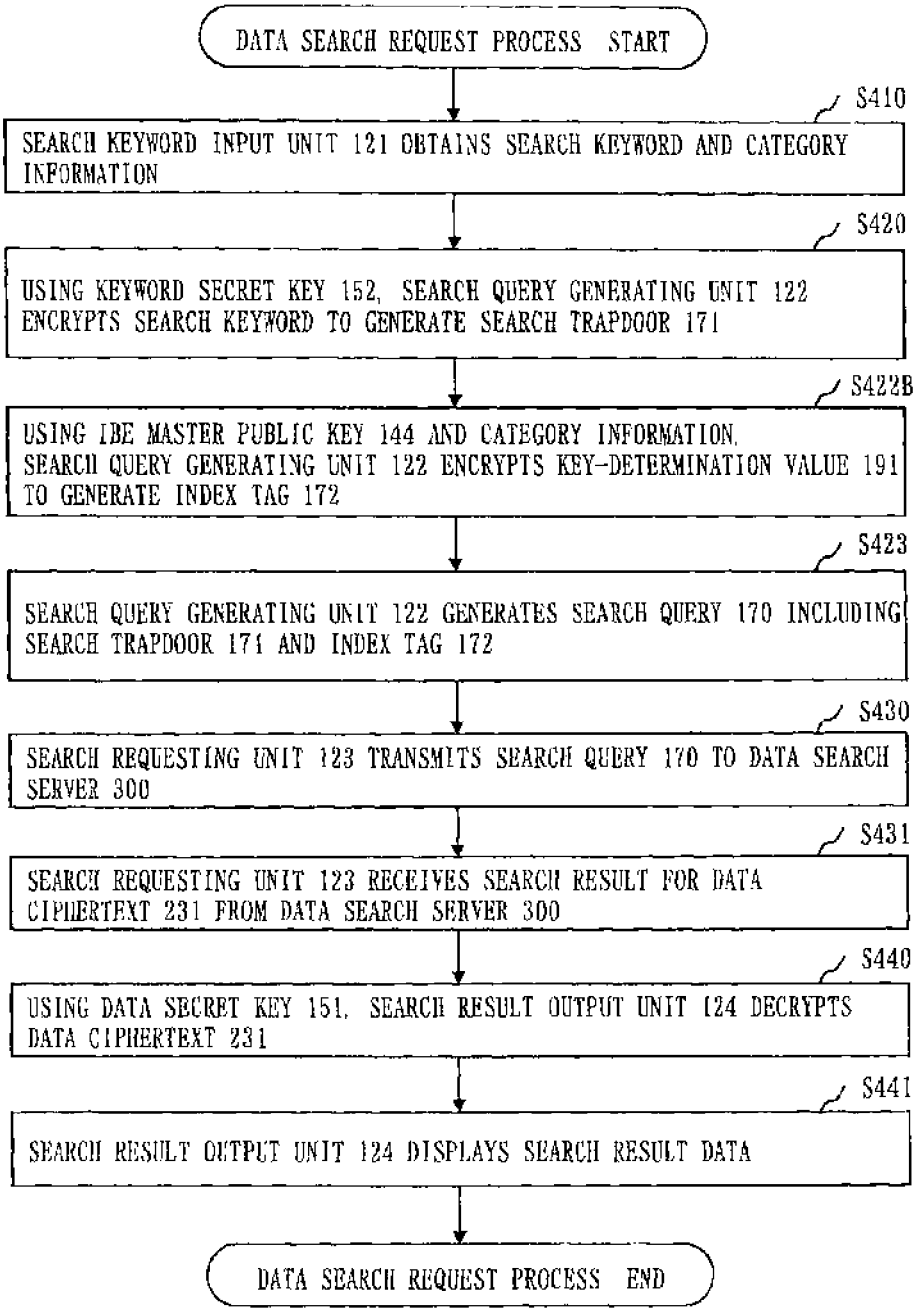
FIG. 24 is a flowchart illustrating a data search request process of the data search terminal 100 in Embodiment 2.

FIG. 24 is a flowchart illustrating a data search request process of the data search terminal 100 in Embodiment 2.

Referring to FIG. 24, the data search request process of the data search terminal 100 in Embodiment 2 will be described.

S410 to S441 to be described below are steps corresponding to S410 to S441 described in Embodiment 1 (see FIG. 13). "B" will be appended as a suffix to a step that is partially different from Embodiment 1.

S410 and S420 are the same as in Embodiment 1. After S420, processing proceeds to S422B.

In S422B, using the IBE master public key 144 and the category information, the search query generating unit 122 executes an encryption algorithm of ID-based encryption, and generates an index tag 172 by encrypting the key-determination value 191. That is, using the IBE master public key 144, the search query generating unit 122 encrypts the key-determination value 191. The category information is used as a parameter.

After S422B, processing proceeds to S423.

S423 to S441 are the same as in Embodiment 1. S441 completes the data search request process.

Figure 25:
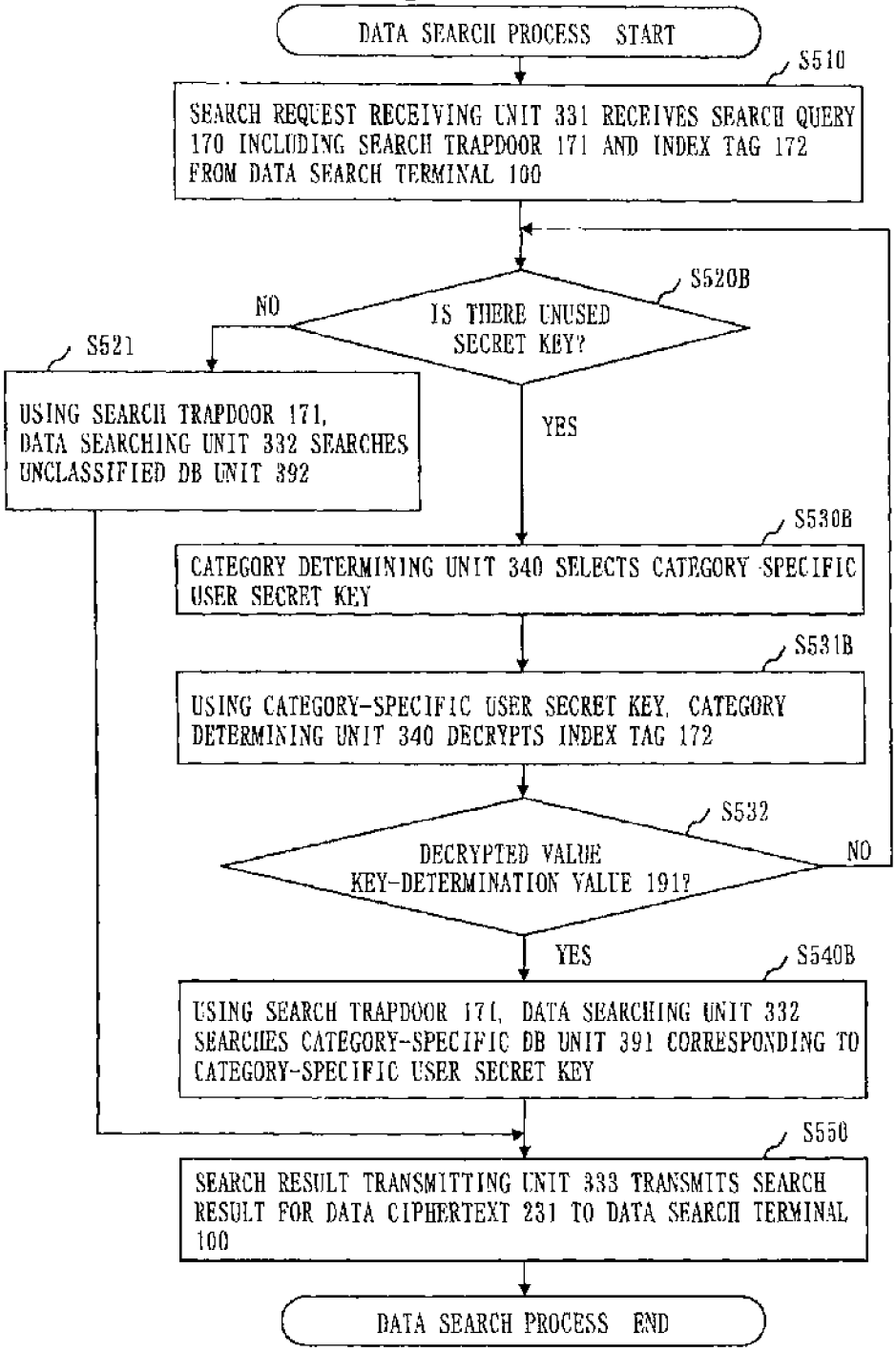
FIG. 25 is a flowchart illustrating a data search process of the data search server 300 in Embodiment 2.

FIG. 25 is a flowchart illustrating a data search process of the data search server 300 in Embodiment 2.

Referring to FIG. 25, the data search process of the data search server 300 in Embodiment 2 will be described.

S510 to S550 to be described below are steps corresponding to S510 to S550 described in Embodiment 1 (see FIG. 14). "B" will be appended as a suffix to a step that is partially different from Embodiment 1.

In S510, the search request receiving unit 331 receives a search query 170 including a search trapdoor 171 and an index tag 172 from the data search terminal 100.

After S510, processing proceeds to S520B.

In S520B, the category determining unit 340 determines whether or not there is any unselected category-specific user secret key which has not been selected in S530B to be described later in the search-server storage unit 390.

If there is any unselected category-specific user secret key (YES), processing proceeds to S530B.

If there is no unselected category-specific user secret key (NO), processing proceeds to S521. In S521, using the search trapdoor 171, the data searching unit 332 searches the unclassified DB unit 392 in accordance with a search algorithm of a PEKS scheme.

In S530B, the category determining unit 340 selects one unselected category-specific user secret key from the search-server storage unit 390.

After S530B, processing proceeds to S531B.

In S531B, using the category-specific user secret key selected in S530B, the category determining unit 340 decrypts the index tag 172.

After S531B, processing proceeds to S532.

In S532, the category determining unit 340 compares the decrypted value of the index tag 172 obtained in S531B with the key-determination value 191.

If the decrypted value of the index tag 172 is equal to the key-determination value 191 (YES), processing proceeds to S540B.

If the decrypted value of the index tag 172 is different from the key-determination value 191 (NO), processing returns to S520B.

In S540B, using the search trapdoor 171, the data searching unit 332 searches the category-specific DB unit 391 corresponding to the category-specific user secret key selected in S530B, in accordance with a search algorithm of a searchable encryption scheme.

After S540B, processing proceeds to S550.

In S550, the search result transmitting unit 333 transmits to the data search terminal 100 a search result including the data ciphertext 231 that has been found as a hit in S540B or S521.

S550 completes the data search process.

Figure 26:
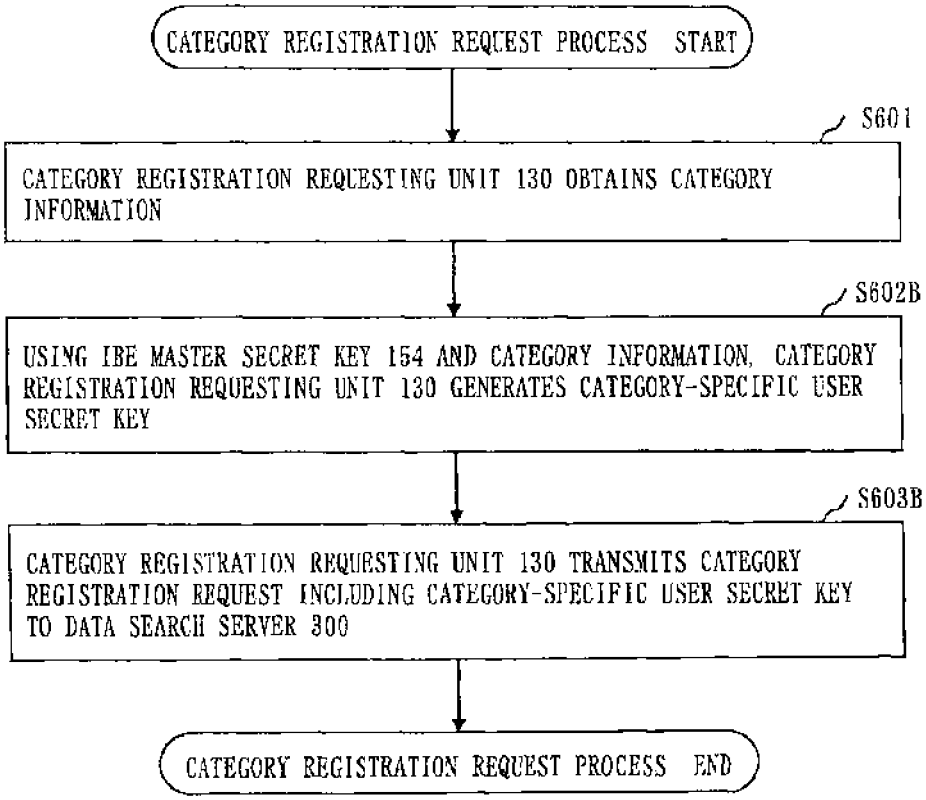
FIG. 26 is a flowchart illustrating a category registration request process of the data search terminal 100 in Embodiment 2.

FIG. 26 is a flowchart illustrating a category registration request process of the data search terminal 100 in Embodiment 2.

Referring to FIG. 26, the category registration request process of the data search terminal 100 in Embodiment 2 will be described.

S601 to S603B to be described below are steps corresponding to S601 to S603 described in Embodiment 1 (see FIG. 15). "B" will be appended as a suffix to a step that is partially different from Embodiment 1.

In S601, the category registration requesting unit 130 obtains category information specified by the searcher.

After S601, processing proceeds to S602B.

In S602B, using the IBE master secret key 154 and the category information, the category registration requesting unit 130 executes a user secret key generation algorithm of ID-based encryption, and generates a category-specific user secret key.

After S602B, processing proceeds to S603B.

In S603B, the category registration requesting unit 130 transmits to the data search server 300 a category registration request including the category-specific user secret key generated in S602B.

S603B completes the category registration request process.

Figure 27:
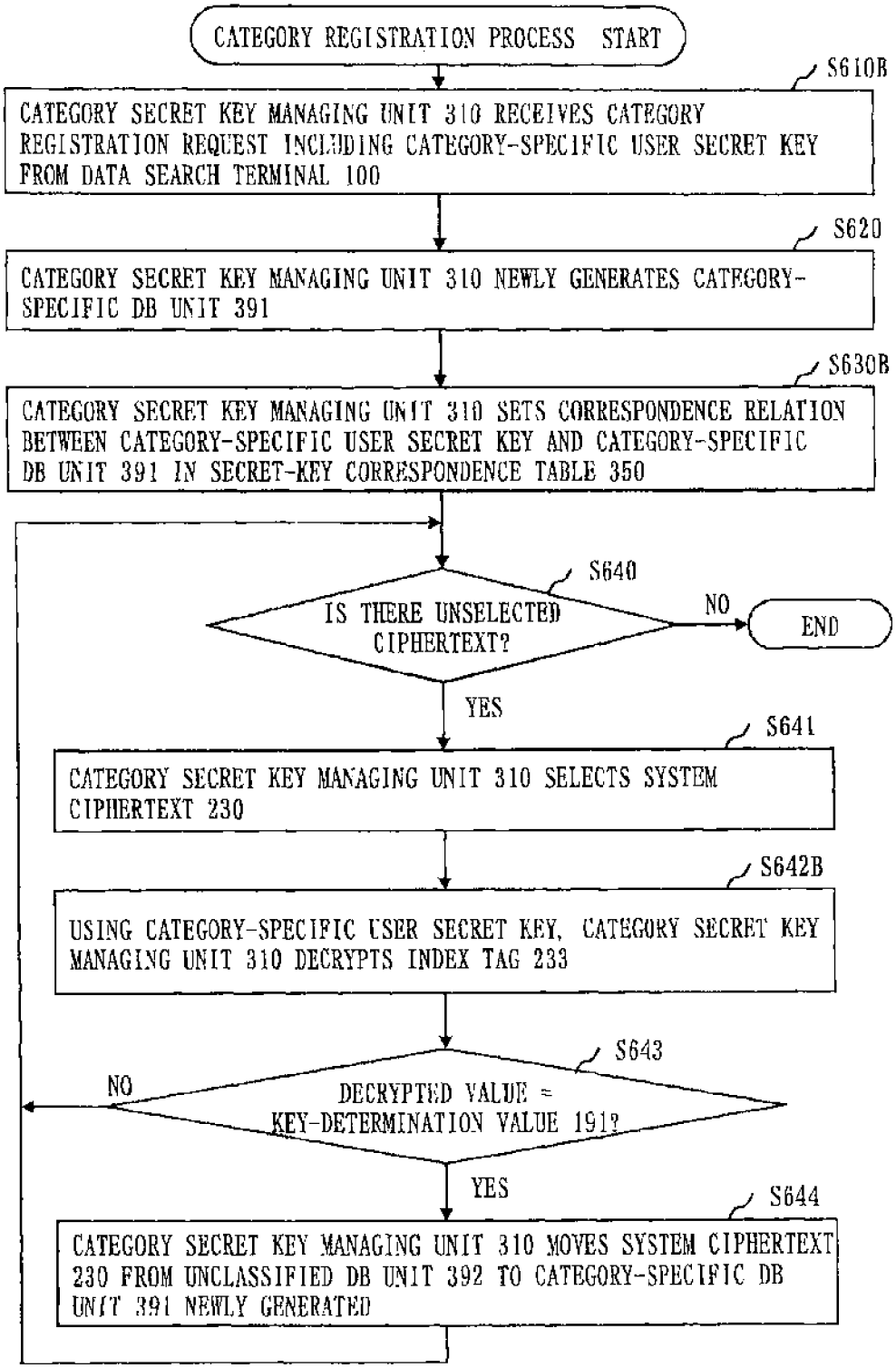
FIG. 27 is a flowchart illustrating a category registration process of the data search server 300 in Embodiment 2.

FIG. 27 is a flowchart illustrating a category registration process of the data search server 300 in Embodiment 2.

Referring to FIG. 27, the category registration process of the data search server 300 in Embodiment 2 will be described.

S610B to S644 to be described below are steps corresponding to S610 to S644 described in Embodiment 1 (see FIG. 16). "B" will be appended as a suffix to a step that is partially different from Embodiment 1.

In S610B, the category secret key managing unit 310 receives the category registration request including the category-specific user secret key from the data search terminal 100.

After S610B, processing proceeds to S620.

In S620, the category secret key managing unit 310 newly generates a category-specific DB unit 391.

After S620, processing proceeds to S630B.

In S630B, the category secret key managing unit 310 sets in the secret-key correspondence table 350 a correspondence relation between the category-specific user secret key and the category-specific DB unit 391 newly generated.

After S630B, processing proceeds to S640.

In S640, the category secret key managing unit 310 determines whether or not there is any unselected system ciphertext 230 which has not been selected in S641 to be described later.

If there is any unselected system ciphertext 230 (YES), processing proceeds to S641.

If there is no unselected system ciphertext 230 (NO), the category registration process ends.

In S641, the category secret key managing unit 310 selects one unselected system ciphertext 230 from the registration-terminal storage unit 290.

After S641, processing proceeds to S642B.

In S642B, using the category-specific user secret key, the category secret key managing unit 310 decrypts the index tag 233.

After S642B, processing proceeds to S643.

In S643, the category secret key managing unit 310 compares the decrypted value of the index tag 233 obtained in S642B with the key-determination value 191.

If the decrypted value of the index tag 233 is equal to the key-determination value 191 (YES), processing proceeds to S644.

If the decrypted value of the index tag 233 is different from the key-determination value 191 (NO), processing returns to S640.

In S644, the category secret key managing unit 310 moves the system ciphertext 230 selected in S641 from the unclassified DB unit 392 to the category-specific DB unit 391 newly generated.

After S644, processing returns to S640.

In Embodiment 2, a public-key correspondence table 160 may be used as in Embodiment 1. In this case, the data search terminal 100 and the data registration terminal 200 operate as described below.

FIG. 28 is a diagram illustrating a public-key correspondence table 160 in Embodiment 2. As shown in FIG. 28, the public-key correspondence table 160 is data associating each ID used as a category-determination public key with a category.

In place of generating a category-specific user public key using category information, the data search terminal 100 and the data registration terminal 200 generate a category-specific user public key using an ID corresponding to a category indicated in category information, among a plurality of IDs indicated in the public-key correspondence table 160.

The data search system 900 in Embodiment 2 can provide, for example, the following effects.

(1) Effects that are substantially the same as those of Embodiment 1 can be obtained. In particular, a faster search can be achieved in PEKS. By using ID-based encryption with anonymity, category information of each ciphertext can be kept secret.

(2) Since a public-key correspondence table is not needed, the data registration terminal 200 can immediately generate an index tag 233 without referring to a public-key correspondence table. Note that a public-key correspondence table may be used.

(3) By using the IBE master public key 144 and the IBE master secret key 154, an increase or decrease in the number of categories can be immediately supported.

Embodiment 3

An embodiment in which functional encryption (FE) is employed in place of ID-based encryption will be described.

Functional encryption is an encryption scheme in which a parameter x is used as a public key and a parameter y is used for generating a user, secret key. If the parameter x and the parameter y satisfy a predetermined relation R(x, y), then a ciphertext can be decrypted.

There are various types of the parameter x, the parameter y, and the relation R(x, y). For example, it is generally the case with functional encryption with attribute hiding that x and y are numerical vectors and the relation R is that the inner-product value of x and y is 0. These types of x, y, and R(x, y) are called inner-product predicates. For example, if x=(1, 34, 5) and y=(−29, 1, −1), then the inner-product value of x and y is 0, so that these x and y satisfy the relation R(x, y).

Attribute hiding refers to the property that the attribute used for encryption cannot be known by looking at a ciphertext (refer to Non-Patent Literature 8). Katz-Sahai-Waters inner-product predicate encryption (KSW-IPE) (see Non-Patent Literature 7) and Okamoto-Takashima inner-product predicate encryption (OT-IPE) (see Non-Patent Literature 8) are examples of a functional encryption scheme with attribute hiding. Sahai-Waters fuzzy ID-based encryption (SW-FIDE) is an example of functional encryption without attribute hiding.

Features that are different from those in Embodiments 1 and 2 will be mainly described. Features not described are substantially the same as those in Embodiment 1 or 2.

A configuration of the data search system 900 and functional configurations of the data search terminal 100, the data registration terminal 200, and the data search server 300 are substantially the same as those in Embodiment 1 (see FIGS. 1, 2, 6, and 8).

However, the data search system 900 differs from that in Embodiments 1 and 2 in the following points.

Since the data search system 900 employs functional encryption, a public-key correspondence table 160 is not needed as in the case of employing ID-based encryption (see Embodiment 2). For this reason, the public-key correspondence table generating unit 112 of the data search terminal 100 is also not needed. However, as in Embodiment 2 (see FIG. 28), a public-key correspondence table 160 associating a parameter x (in place of an ID) with a category may be used.

Figure 29:
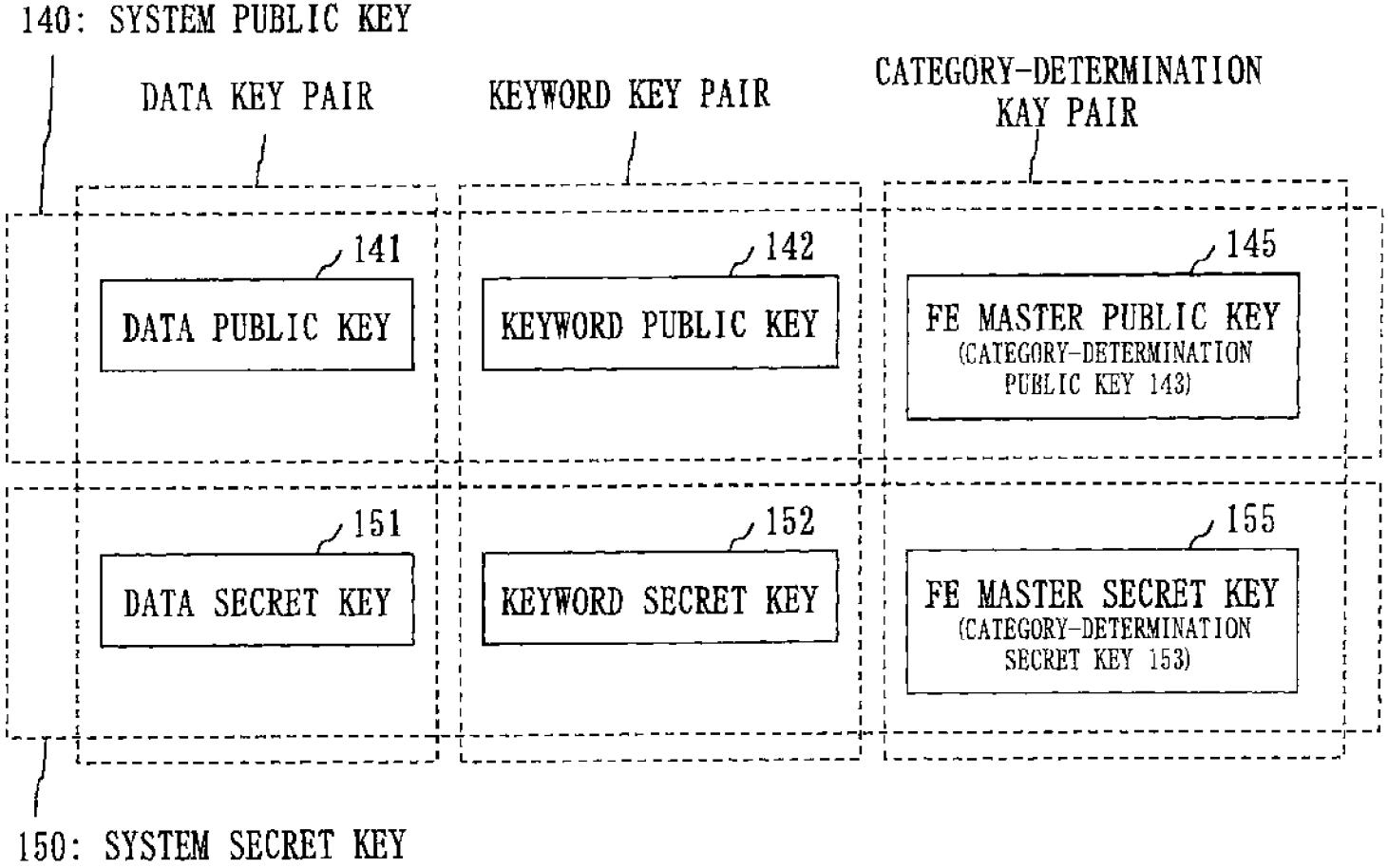
FIG. 29 is a diagram illustrating a system public key 140 and a system secret key 150 in Embodiment 3.

FIG. 29 is a diagram illustrating a system public key 140 and a system secret key 150 in Embodiment 3.

Referring to FIG. 29, the system public key 140 and the system secret key 150 in Embodiment 3 will be described.

The system public key 140 has one FE master public key 145 in place of a plurality of the category-determination public keys 143 described in Embodiment 1 (see FIG. 3). The FE master public key 145 is a master public key of functional encryption.

The system secret key 150 has one FE master secret key 155 in place of a plurality of the category-determination secret keys 153 described in Embodiment 1 (see FIG. 3). The FE master secret key 155 is a master secret key of functional encryption.

A setup process of the data search terminal 100 is substantially the same as that in Embodiment 2 (see FIG. 21).

However, the system key generating unit 111 generates a system public key 140 including a master public key of functional encryption in place of the IBE master public key 144, and generates a system secret key 150 including a master secret key of functional encryption in place of the IBE master secret key 154 (S110B).

A data registration request process of the data registration terminal 200 is substantially the same as that in Embodiment 2 (see FIG. 22).

However, the index tag generating unit 224 generates an index tag 233 by encrypting the key-determination value 191 using the master public key of functional encryption in place of the IBE master public key 144 (S241B).

For example, the index tag generating unit 224 generates a user public key by setting category information (category name) in "CN" of a master public key "vector x (CN, 1)". Using the generated user public key, the index tag generating unit 224 encrypts the key-determination value 191 to generate the index tag 233. That is, the index tag generating unit 224 generates the index tag 233 using as the public key a parameter x including the category information.

The registering person may specify a category using a complex condition taking advantage of characteristics of functional encryption. For example, it is known that an AND condition or an OR condition can be specified using inner-product predicate encryption. It is also known that a NOT condition can be specified using functional encryption without attribute hiding. The index tag generating unit 224 uses a vector x formatted according to a search condition as a public key.

A data registration process of the data search server 300 is substantially the same as that in Embodiment 2 (see FIG. 23).

However, each category-specific user secret key is a user secret key of functional encryption instead of ID-based encryption.

A data search request process of the data search terminal 100 is substantially the same as that in Embodiment 2 (see FIG. 24).

However, like the index tag generating unit 224 described above, the search query generating unit 122 executes an encryption algorithm of a functional encryption scheme using the master public key of functional encryption in place of the IBE master public key 144, and encrypts the key-determination value 191 to generate an index tag 172 (S422B).

A data search process of the data search server 300 is substantially the same as that in Embodiment 2 (see FIG. 25).

However, each category-specific user secret key is a user secret key of functional encryption instead of ID-based encryption.

A category registration request process of the data search terminal 100 is substantially the same as that in Embodiment 2 (see FIG. 26).

However, the category registration requesting unit 130 generates a category-specific user secret key using the master secret key of functional encryption in place of the IBE master secret key 154 (S602B).

For example, the category registration requesting unit 130 generates a category-specific user secret key by executing a user secret key generation algorithm of a functional encryption scheme using the master secret key of functional encryption and a vector y (−1, CN) as input, where CN is category information (category name). That is, the index tag generating unit 224 generates the category-specific user secret key by using a parameter y including the category information.

The searcher may specify a category with a complex condition taking advantage of characteristics of functional encryption. For example, it is known that an AND condition or an OR condition can be specified using inner-product predicate encryption. It is also known that a NOT condition can be specified using functional encryption without attribute hiding. In this case, the category registration requesting unit 130 uses a vector y formatted according to a condition.

A category registration process of the data search server 300 is substantially the same as that in Embodiment 2 (see FIG. 27).

However, each category-specific user secret key is a user secret key of functional encryption instead of ID-based encryption.

The data search system 900 in Embodiment 3 can provide, for example, the following effects.

(1) Effects that are substantially the same as those of Embodiments 1 and 2 can be obtained. In particular, a faster search can be achieved in PEKS. By employing functional encryption with attribute hiding, category information of each ciphertext can be kept secret.

(2) Categories can be specified with more flexible conditions (AND condition, OR condition, NOT condition, etc.) compared to conditions for categories (ID match) when ID-based encryption is employed.

LIST OF REFERENCE SIGNS

100: data search terminal; 110: setup processing unit; 111: system key generating unit; 112: public-key correspondence table generating unit; 113: key information publishing unit; 120: search request processing unit; 121: search keyword input unit; 122: search query generating unit; 123: search requesting unit; 124: search result output unit; 130: category registration requesting unit; 140: system public key; 141: data public key; 142: keyword public key; 143: category-determination public key; 144: IBE master public key; 150: system secret key; 151: data secret key; 152: keyword secret key; 153: category-determination secret key; 154: IBE master secret key; 160, 161: public-key correspondence table; 170: search query; 171: search trapdoor; 172: index tag; 190: search-terminal storage unit; 191: key-determination value; 192: key-determination-value correspondence table; 199: search result; 200: data registration terminal; 210: public information acquisition unit; 220: data registration request processing unit; 221: registration information input unit; 222: data ciphertext generating unit; 223: keyword ciphertext generating unit; 224: index tag generating unit; 225: data registration requesting unit; 230: system ciphertext; 231: data ciphertext; 232: keyword ciphertext; 233: index tag; 290: registration-terminal storage unit; 300: data search server; 310: category secret key managing unit; 320: data registration processing unit; 321: registration request receiving unit; 322: data registering unit; 330: data search processing unit; 331: search request receiving unit; 332: data searching unit; 333: search result transmitting unit; 340: category determining unit; 350: secret-key correspondence table; 390: search-server storage unit; 391: category-specific DB unit; 392: unclassified DB unit; 900: data search system; 901: CPU; 902: bus; 903: ROM; 904: RAM; 905: communication board; 909: network; 911: display; 912: keyboard; 913: mouse; 914: drive; 920: magnetic disk device; 921: OS; 922: programs; 923: files

The invention claimed is:

1. A data search device comprising:

a data storage unit configured to store a plurality of data groups into which pieces of search target data are classified and a plurality of decryption keys for decrypting encrypted identifiers of the data groups, by associating each of the plurality of the data groups with each of the plurality of the decryption keys;

a key-determination information storage unit configured to store key-determination information which is a value for determining a decryption key;

a search condition input unit configured to obtain a search condition which is a condition for searching for data, and obtain encrypted information generated by encrypting an identifier of a data group to be searched;

a data group selecting unit configured to decrypt the encrypted information obtained by the search condition input unit by using one or more of the plurality of the decryption keys stored in the data storage unit, thereby generating one or more corresponding decryption results, identify a decryption key of the plurality of the decryption keys that corresponds to a matched decryption result among the one or more corresponding decryption results, the matched decryption result being the same as the key-determination information, and select as a search target group a data group associated with the identified decryption key, from among the plurality of the data groups stored in the data storage unit;

a data searching unit configured to obtain as search result data a piece of data that satisfies the search condition obtained by the search condition input unit, from among pieces of data included in the search target group selected by the data group selecting unit; and a search result output unit configured to output the search result data obtained by the data searching unit.

2. The data search device according to claim 1, further comprising:

a new data input unit configured to obtain new data and an encrypted tag generated by encrypting an identifier of a data group; and a new data registering unit configured to add the new data obtained by the new data input unit to a registration target group which is selected from among the plurality of the data groups by the data group selecting unit, wherein the data group selecting unit is configured to decrypt the encrypted tag obtained by the new data input unit by using one or more of the plurality of the decryption keys, identify another decryption key of the plurality of the decryption keys that corresponds to a decryption result which is the same as the key-determination information, and select as the registration target group a data group associated with the another identified decryption key, from among the plurality of the data groups.

3. The data search device according to claim 1, wherein the data storage unit is configured to further store an unclassified group as a data group including a plurality of pieces of data and a plurality of encrypted tags generated by encrypting the identifiers of the data groups, each of the plurality of the pieces of data being associated with each of the plurality of the encrypted tags, the data search device further comprising:

an additional decryption key input unit configured to obtain a new decryption key as an additional decryption key; and a data group registering unit configured to decrypt the plurality of the encrypted tags included in the unclassified group by using the additional decryption key obtained by the additional decryption key input unit, select an encrypted tag of the plurality of the encrypted tags that generates a decryption result which is the same as the key-determination information, extract a piece of data associated with the selected encrypted tag, from among the plurality of the pieces of data included in the unclassified group, generate an additional group including the piece of data extracted, as a new data group to be added to the plurality of the data groups, and store the additional group generated and the additional decryption key in the data storage unit by associating the additional group generated with the additional decryption key.

4. A data search method that is executed using a data search device, the data search device including a data storage unit, a key-determination information storage unit, a search condition input unit, a data group selecting unit, a data searching unit, and a search result output unit, the data storage unit being configured to store a plurality of data groups into which pieces of search target data are classified and a plurality of decryption keys for decrypting encrypted identifiers of the data groups, by associating each of the plurality of the data groups with each of the plurality of the decryption keys, the key-determination information storage unit being configured to store key-determination information which is a value for determining a decryption key, the data search method comprising:

obtaining a search condition which is a condition for searching for data, and obtaining encrypted information generated by encrypting an identifier of a data group to be searched, by the search condition input unit;

decrypting the encrypted information obtained by the search condition input unit by using one or more of the plurality of the decryption keys stored in the data storage unit, thereby generating one or more corresponding decryption results;

identifying a decryption key of the plurality of the decryption keys that corresponds to a matched decryption result among the one or more corresponding decryption results, the matched decryption result being the same as the key-determination information;

selecting as a search target group a data group associated with the identified decryption key, from among the plurality of the data groups stored in the data storage unit, by the data group selecting unit;

obtaining as search result data, by the data searching unit, a piece of data that satisfies the search condition obtained by the search condition input unit, from among pieces of data included in the search target group selected by the data group selecting unit; and outputting, by the search result output unit, the search result data obtained by the data searching unit.

5. A non-transitory computer readable medium storing a data search program, which uses a data storage unit and a key-determination information storage unit, the data storage unit being configured to store a plurality of data groups into which pieces of search target data are classified and a plurality of decryption keys for decrypting encrypted identifiers of the data groups, by associating each of the plurality of the data groups with each of the plurality of the decryption keys, the key-determination information storage unit being configured to store key-determination information which is a value for determining a decryption key, the data search program causing a computer to execute processes comprising:

a search condition input process of obtaining a search condition which is a condition for searching for data, and obtaining encrypted information generated by encrypting an identifier of a data group to be searched;

a data group selecting process including decrypting the encrypted information obtained by the search condition input process by using one or more of the plurality of the decryption keys stored in the data storage unit, identifying a decryption key of the plurality of the decryption keys that corresponds to a matched decryption result among the one or more corresponding decryption results, the matched decryption result being the same as the key-determination information, and selecting as a search target group a data group associated with the identified decryption key, from among the plurality of the data groups stored in the data storage unit;

a data searching process of obtaining as search result data a piece of data that satisfies the search condition obtained by the search condition input process, from among pieces of data included in the search target group selected by the data group selecting process; and a search result output process of outputting the search result data obtained by the data searching process.

6. A data registration device comprising:

a data generating unit configured to generate data;

a classification information input unit configured to obtain classification information indicating a classification of the data generated by the data generating unit;

an encrypted tag generating unit configured to generate an encrypted tag for selecting a data group of the classification indicated by the classification information, based on the classification information obtained by the classification information input unit, the encrypted tag being arranged such that a decryption result of decrypting the encrypted tag using a predetermined decryption key associated with the data group of the classification matches a predetermined key-determination information stored in a data search device in association with the predetermined decryption key; and a data registration requesting unit configured to transmit to the data search device the data generated by the data generating unit with the encrypted tag generated by encrypted tag generating unit, thereby causing the data search device to execute a process of adding the data to the data group of the classification indicated by the classification information, as search target data.

7. The data registration device according to claim 6, further comprising:

an encryption key storage unit configured to store a plurality of encryption keys and a plurality of pieces of classification information by associating each of the plurality of the encryption keys with each of the plurality of the pieces of classification information, wherein the encrypted tag generating unit is configured to select an encryption key associated with same classification information as the classification information obtained by the classification information input unit, from among the plurality of the encryption keys stored in the encryption key storage unit, and generate the encrypted tag by using the encryption key selected.

8. The data registration device according to claim 6, wherein the encrypted tag generating unit is configured to generate the encrypted tag in accordance with an ID-based encryption scheme using an ID based on the classification information.

9. The data registration device according to claim 6, wherein the encrypted tag generating unit is configured to generate the encrypted tag in accordance with a functional encryption scheme using a vector including the classification information.

10. A data registration method that is executed using a data registration device including a data generating unit, a classification information input unit, an encrypted tag generating unit, and a data registration requesting unit, the data registration method comprising:

generating data, by the data generating unit;

obtaining, by the classification information input unit, classification information indicating a classification of the data generated by the data generating unit;

generating, by the encrypted tag generating unit, an encrypted tag for selecting a data group of the classification indicated by the classification information, based on the classification information obtained by the classification information input unit, the encrypted tag being arranged such that a decryption result of decrypting the encrypted tag using a predetermined decryption key associated with the data group of the classification matches a predetermined key-determination information stored in a data search device in association with the predetermined decryption key; and transmitting, by the data registration requesting unit, the data generated by the data generating unit with the encrypted tag generated by the encrypted tag generating unit to the data search device, thereby causing the data search device to execute a process of adding the data to the data group of the classification indicated by the classification information, as search target data.

11. A non-transitory computer readable medium storing a data registration program for causing a computer to execute processes comprising:

a data generating process of generating data;

a classification information input process of obtaining classification information indicating a classification of the data generated by the data generating process;

an encrypted tag generating process of generating an encrypted tag for selecting a data group of the classification indicated by the classification information, based on the classification information obtained by the classification information input process, the encrypted tag being arranged such that a decryption result of decrypting the encrypted tag using a predetermined decryption key associated with the data group of the classification matches a predetermined key-determination information stored in a data search device in association with the predetermined decryption key; and a data registration requesting process of transmitting to the data search device the data generated by the data generating process with the encrypted tag generated by the encrypted tag generating process, thereby causing the data search device to execute a process of adding the data to the data group of the classification indicated by the classification information, as search target data.

12. An information processing device comprising:

a search condition input unit configured to obtain a search condition for searching for data, and obtain classification information indicating a classification of the data;

an encrypted tag generating unit configured to generate an encrypted tag for selecting a data group of the classification indicated by the classification information, based on the classification information obtained by the search condition input unit, the encrypted tag being arranged such that a decryption result of decrypting the encrypted tag using a predetermined decryption key associated with the data group of the classification matches a predetermined key-determination information stored in a data search device in association with the predetermined decryption key; and a data search requesting unit configured to transmit to the data search device information of the search condition obtained by the search condition input unit with the encrypted tag generated by the encrypted tag generating unit, and receive as search result data from the data search device a piece of data that satisfies the search condition, from among pieces of data included in the data group of the classification indicated by the classification information.

13. The information processing device according to claim 12, further comprising:

an encryption key storage unit configured to store a plurality of encryption keys and a plurality of pieces of classification information by associating each of the plurality of the encryption keys with each of the plurality of the pieces of classification information, wherein the encrypted tag generating unit is configured to select an encryption key associated with same classification information as the classification information obtained by the search condition input unit, from among the plurality of the encryption keys stored in the encryption key storage unit, and generate the encrypted tag by using the encryption key selected.

14. The information processing device according to claim 12, wherein the encrypted tag generating unit is configured to generate the encrypted tag in accordance with an ID-based encryption scheme using an ID based on the classification information.

15. The information processing device according to claim 12, wherein the encrypted tag generating unit is configured to generate the encrypted tag in accordance with a functional encryption scheme using a vector including the classification information.

16. A data search method that is executed using an information processing device including a search condition input unit, an encrypted tag generating unit, and a data search requesting unit, the data search method comprising:

obtaining a search condition for searching for data, and obtaining classification information indicating a classification of the data, by the search condition input unit;

generating, by the encrypted tag generating unit, an encrypted tag for selecting a data group of the classification indicated by the classification information, based on the classification information obtained by the search condition input unit, the encrypted tag being arranged such that a decryption result of decrypting the encrypted tag using a predetermined decryption key associated with the data group of the classification matches a predetermined key-determination information stored in a data search device in association with the predetermined decryption key; and transmitting, by the data search requesting unit, information of the search condition obtained by the search condition input unit with the encrypted tag generated by the encrypted tag generating unit to the data search device, and receiving as search result data from the data search device a piece of data that satisfies the search condition, from among pieces of data included in the data group of the classification indicated by the classification information.

17. A non-transitory computer readable medium storing a data search program for causing a computer to execute processes comprising:

a search condition input process of obtaining a search condition for searching for data, and obtaining classification information indicating a classification of the data;

an encrypted tag generating process of generating an encrypted tag for selecting a data group of the classification indicated by the classification information, based on the classification information obtained by the search condition input process, the encrypted tag being arranged such that a decryption result of decrypting the encrypted tag using a predetermined decryption key associated with the data group of the classification matches a predetermined key-determination information stored in a data search device in association with the predetermined decryption key; and a data search requesting process of transmitting to the data search device information of the search condition obtained by the search condition input process with the encrypted tag generated by the encrypted tag generating process, and receiving as search result data from the data search device a piece of data that satisfies the search condition, from among pieces of data included in the data group of the classification indicated by the classification information.

*18. An information processing device, comprising:*

*a communication circuit; and*

*a processing circuit coupled with the communication circuit and configured to:*

*for searching for data*

*generate an encrypted tag for selecting a data group of a classification indicated by classification information associated with a search condition, the encrypted tag being arranged such that a decryption result of decrypting the encrypted tag using a predetermined decryption key associated with the data group of the classification matches a predetermined key-determination information stored in a data search device in association with the predetermined decryption key;*

*transmit, to the data search device using the communication circuit, information of the search condition and the generated encrypted tag; and*

*receive, as search result data from the data search device, a piece of data that satisfies the search condition from pieces of data included in the data group of the classification.*

*19. The information processing device according to claim 18, further comprising:*

*a storage device configured to store a plurality of encryption keys and a plurality of pieces of classification information by associating each of the plurality of the encryption keys with each of the plurality of the pieces of classification information,*

*wherein the processing circuit is configured to select an encryption key associated with same classification information as the classification information from the plurality of the encryption keys stored in the storage device, and generate the encrypted tag by using the selected encryption key.*

*20. The information processing device according to claim 18,*

*wherein the processing circuit is configured to generate the encrypted tag in accordance with an ID-based encryption scheme using an ID based on the classification information.*

*21. The information processing device according to claim 18,*

*wherein the processing circuit is configured to generate the encrypted tag in accordance with a functional encryption scheme using a vector including the classification information.*

* * * * *